US008966838B2

(12) United States Patent
Jenkins

(10) Patent No.: US 8,966,838 B2
(45) Date of Patent: *Mar. 3, 2015

(54) PHOTOVOLTAIC SYSTEMS, METHODS FOR INSTALLING PHOTOVOLTAIC SYSTEMS, AND KITS FOR INSTALLING PHOTOVOLTAIC SYSTEMS

(71) Applicant: CertainTeed Corporation, Valley Forge, PA (US)

(72) Inventor: Robert L. Jenkins, Honey Brook, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,109

(22) Filed: Feb. 11, 2014

(65) Prior Publication Data

US 2014/0157694 A1 Jun. 12, 2014

Related U.S. Application Data

(63) Continuation of application No. 12/730,915, filed on Mar. 24, 2010, now Pat. No. 8,646,228.

(60) Provisional application No. 61/162,950, filed on Mar. 24, 2009.

(51) Int. Cl.
*E04D 13/18* (2014.01)
*E04D 13/14* (2006.01)
(Continued)

(52) U.S. Cl.
CPC ............ *F24J 2/5201* (2013.01); *H01L 31/0422* (2013.01); *H01L 31/0482* (2013.01);
(Continued)

(58) Field of Classification Search
CPC ... F24J 2/5201; F24J 2/045; F24J 2002/5294; H01L 31/0422; H01L 31/0482; Y02B 10/12; Y02B 10/20; Y02E 10/50

USPC ............... 52/58, 59, 60, 61, 62, 173.3, 302.6, 52/745.06; 126/621, 622, 623; 136/244, 136/251, 206, 230

See application file for complete search history.

(56) References Cited

U.S. PATENT DOCUMENTS 2,671,441 A 3/1954 Harris
3,769,091 A 10/1973 Leinkram et al.
(Continued)

FOREIGN PATENT DOCUMENTS

CA 2753548 3/2012
WO WO 2010111383 A3 * 11/2010
WO WO 2012151700 A1 * 11/2012

*Primary Examiner* — Basil Katcheves
*Assistant Examiner* — Rodney Mintz
(74) *Attorney, Agent, or Firm* — McDonnelll Boehnen Hulbert & Berghoff LLP

(57) ABSTRACT

The present invention relates particularly to photovoltaic systems for use in photovoltaically generating electrical energy. One aspect of the invention is a photovoltaic roofing system disposed on a roof deck. The photovoltaic roofing system includes one or more photovoltaic elements contiguously disposed on the roof deck, the contiguously-disposed photovoltaic elements defining a photovoltaic area; a plurality of roofing elements disposed adjacent the contiguously-disposed photovoltaic elements, along their side edges; side flashing disposed along the side edges of the contiguously-disposed photovoltaic elements, the side flashing having a cross-sectional shape comprising a vertically-extending feature and a flange extending from each lateral side at the bottom of the vertically-extending feature, with the flange facing the photovoltaic area being at least partially disposed between a photovoltaic element and the roof deck, and the flange facing away from the photovoltaic area being at least partially disposed between a roofing element and the roof deck.

21 Claims, 15 Drawing Sheets

(51) Int. Cl.
  *E04B 7/00* (2006.01)
  *F24J 2/52* (2006.01)
  *H01L 31/042* (2014.01)
  *H01L 31/048* (2014.01)
  *F24J 2/04* (2006.01)

(52) U.S. Cl.
  CPC .......... *F24J 2/045* (2013.01); *F24J 2002/5294* (2013.01); *Y02B 10/12* (2013.01); *Y02B 10/20* (2013.01); *Y02E 10/50* (2013.01)
  USPC .......... 52/173.3; 52/58; 52/302.6; 52/745.06; 136/244

(56) References Cited

U.S. PATENT DOCUMENTS

| | | | |
|---|---|---|---|
| 4,029,080 A | 6/1977 | Warren | |
| 4,040,867 A | 8/1977 | Forestieri et al. | |
| 4,180,414 A | 12/1979 | Diamond et al. | |
| 4,189,881 A | 2/1980 | Hawley | |
| 4,194,498 A | 3/1980 | Mayerovitch | |
| 4,233,795 A | 11/1980 | Snyder et al. | |
| 4,244,355 A | 1/1981 | Stout | |
| 4,263,896 A | 4/1981 | Zebuhr | |
| 4,296,740 A | 10/1981 | Meckler | |
| 4,308,858 A | 1/1982 | Skillman | |
| 4,321,745 A | 3/1982 | Ford | |
| 4,390,010 A | 6/1983 | Skillman | |
| 4,393,859 A | 7/1983 | Marossy et al. | |
| 4,416,265 A | 11/1983 | Wallace | |
| 4,617,420 A | 10/1986 | Dilts et al. | |
| 4,636,577 A | 1/1987 | Peterpaul | |
| 4,677,248 A | 6/1987 | Lacey | |
| 4,936,063 A | 6/1990 | Humphrey | |
| 5,022,381 A | 6/1991 | Allegro | |
| 5,056,288 A | 10/1991 | Funaki | |
| 5,092,939 A | 3/1992 | Nath et al. | |
| 5,112,408 A | 5/1992 | Melchior | |
| 5,232,518 A | 8/1993 | Nath et al. | |
| 5,316,592 A | 5/1994 | Dinwoodie | |
| 5,409,549 A | 4/1995 | Mori | |
| 5,437,735 A * | 8/1995 | Younan et al. | 136/251 |
| 5,509,246 A | 4/1996 | Roddy | |
| 5,522,189 A | 6/1996 | Mortensen et al. | |
| 5,524,401 A | 6/1996 | Ishikawa et al. | |
| 5,575,861 A | 11/1996 | Younan et al. | |
| 5,590,495 A | 1/1997 | Bressler et al. | |
| 5,613,337 A | 3/1997 | Plath et al. | |
| 5,746,839 A | 5/1998 | Dinwoodie | |
| 5,787,653 A | 8/1998 | Sakai et al. | |
| 5,990,414 A | 11/1999 | Posnansky | |
| 6,093,884 A | 7/2000 | Toyomura et al. | |
| 6,155,006 A | 12/2000 | Mimura et al. | |
| 6,173,546 B1 | 1/2001 | Schafer | |
| 6,182,403 B1 | 2/2001 | Mimura et al. | |
| 6,269,596 B1 | 8/2001 | Ohtsuka et al. | |
| 6,298,625 B1 | 10/2001 | Sweet | |
| 6,336,304 B1 | 1/2002 | Mimura et al. | |
| 6,463,708 B1 | 10/2002 | Anderson | |
| 6,521,821 B2 | 2/2003 | Makita et al. | |
| 6,541,693 B2 | 4/2003 | Takada et al. | |
| 6,584,737 B1 | 7/2003 | Bradley, Jr. | |
| 6,617,507 B2 | 9/2003 | Mapes et al. | |
| 6,729,081 B2 | 5/2004 | Nath et al. | |
| 6,730,841 B2 | 5/2004 | Heckeroth | |
| 6,786,012 B2 | 9/2004 | Bradley, Jr. | |
| 6,883,290 B2 | 4/2005 | Dinwoodie | |
| 6,912,813 B2 | 7/2005 | Grizenko | |
| 7,069,698 B2 * | 7/2006 | Nee | 52/24 |
| 7,102,074 B2 | 9/2006 | Yen et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,307,209 B2 | 12/2007 | Mapes | |
| 7,328,534 B2 | 2/2008 | Dinwoodie | |
| 7,690,166 B2 | 4/2010 | Kagiyama et al. | |
| 7,732,243 B2 | 6/2010 | Luch | |
| 7,772,484 B2 | 8/2010 | Li et al. | |
| 7,777,128 B2 | 8/2010 | Montello et al. | |
| 7,781,672 B2 | 8/2010 | Gaudiana et al. | |
| 7,829,781 B2 | 11/2010 | Montello et al. | |
| 7,861,478 B2 | 1/2011 | Kalkanoglu et al. | |
| 7,900,413 B2 | 3/2011 | Stanley | |
| 7,935,202 B2 * | 5/2011 | Stanley | 156/71 |
| 7,937,900 B1 | 5/2011 | Gaffney et al. | |
| 8,015,770 B2 | 9/2011 | Kalkanoglu et al. | |
| 8,124,866 B2 | 2/2012 | Mapes et al. | |
| 8,205,400 B2 | 6/2012 | Allen | |
| 8,215,071 B2 | 7/2012 | Lenox | |
| 8,230,656 B2 | 7/2012 | Kalkanoglu et al. | |
| 8,316,592 B2 | 11/2012 | Lanza | |
| 8,341,917 B2 | 1/2013 | Resso et al. | |
| 8,347,565 B2 | 1/2013 | Carroll | |
| 8,397,447 B2 | 3/2013 | Heisler | |
| 8,424,256 B2 | 4/2013 | Cook et al. | |
| 8,499,524 B2 * | 8/2013 | Stanley | 52/698 |
| 8,524,029 B2 * | 9/2013 | Stanley | 156/292 |
| 8,557,070 B2 * | 10/2013 | Stanley | 156/71 |
| 8,601,753 B2 * | 12/2013 | Gombarick, Jr. | 52/173.3 |
| 8,601,754 B2 * | 12/2013 | Jenkins et al. | 52/173.3 |
| 8,608,884 B2 * | 12/2013 | Stanley | 156/71 |
| 8,623,158 B2 * | 1/2014 | Stanley | 156/71 |
| 8,631,614 B2 * | 1/2014 | Livsey et al. | 52/173.3 |
| 8,646,228 B2 * | 2/2014 | Jenkins | 52/173.3 |
| 8,677,702 B2 * | 3/2014 | Jenkins | 52/173.3 |
| 8,701,360 B2 * | 4/2014 | Ressler | 52/173.3 |
| 8,713,861 B2 * | 5/2014 | Desloover | 52/173.3 |
| 8,763,316 B2 * | 7/2014 | Concho et al. | 52/84 |
| 8,782,972 B2 * | 7/2014 | Grieco | 52/173.3 |
| 8,793,941 B2 * | 8/2014 | Bosler et al. | 52/173.3 |
| 2001/0034982 A1 | 11/2001 | Nagao et al. | |
| 2002/0083672 A1 | 7/2002 | Ostenfeldt | |
| 2003/0094193 A1 | 5/2003 | Crosser et al. | |
| 2003/0121217 A1 | 7/2003 | Grizenko | |
| 2003/0154666 A1 | 8/2003 | Dinwoodie | |
| 2003/0154667 A1 | 8/2003 | Dinwoodie | |
| 2003/0219568 A1 * | 11/2003 | Nee | 428/138 |
| 2004/0187094 A1 * | 9/2004 | Sato et al. | 136/251 |
| 2005/0086873 A1 | 4/2005 | Mares | |
| 2005/0115162 A1 * | 6/2005 | Nee | 52/24 |
| 2005/0166955 A1 | 8/2005 | Nath et al. | |
| 2006/0032527 A1 | 2/2006 | Stevens et al. | |
| 2006/0266405 A1 | 11/2006 | Lenox | |
| 2007/0193618 A1 | 8/2007 | Bressler et al. | |
| 2008/0035140 A1 | 2/2008 | Placer et al. | |
| 2008/0053009 A1 | 3/2008 | Plaisted et al. | |
| 2008/0087320 A1 | 4/2008 | Mapes et al. | |
| 2008/0098672 A1 | 5/2008 | O'Hagin et al. | |
| 2008/0190047 A1 | 8/2008 | Allen | |
| 2008/0289272 A1 | 11/2008 | Flaherty et al. | |
| 2008/0302030 A1 | 12/2008 | Stancel et al. | |
| 2008/0302031 A1 | 12/2008 | Bressler et al. | |
| 2008/0302407 A1 | 12/2008 | Kobayashi | |
| 2008/0313976 A1 * | 12/2008 | Allen | 52/173.1 |
| 2009/0000221 A1 | 1/2009 | Jacobs et al. | |
| 2009/0000222 A1 | 1/2009 | Kalkanoglu et al. | |
| 2009/0107073 A1 * | 4/2009 | Kalkanoglu et al. | 52/411 |
| 2009/0178350 A1 | 7/2009 | Kalkanoglu et al. | |
| 2009/0205270 A1 | 8/2009 | Shaw et al. | |
| 2009/0211621 A1 * | 8/2009 | LeBlanc | 136/244 |
| 2009/0223550 A1 | 9/2009 | Curtin et al. | |
| 2009/0282755 A1 | 11/2009 | Abbott et al. | |
| 2009/0293383 A1 | 12/2009 | Venter et al. | |
| 2010/0170169 A1 | 7/2010 | Railkar et al. | |
| 2010/0180523 A1 | 7/2010 | Lena et al. | |
| 2010/0236542 A1 | 9/2010 | Pierson et al. | |
| 2010/0242381 A1 | 9/2010 | Jenkins | |
| 2010/0263661 A1 | 10/2010 | Faulkner | |
| 2010/0275534 A1 | 11/2010 | Ruskin et al. | |
| 2010/0313499 A1 | 12/2010 | Gangemi | |
| 2010/0313501 A1 | 12/2010 | Gangemi | |
| 2010/0313928 A1 | 12/2010 | Rose et al. | |
| 2011/0000158 A1 * | 1/2011 | Kalkanoglu et al. | 52/309.3 |
| 2011/0005152 A1 | 1/2011 | Plaisted et al. | |

(56) References Cited

U.S. PATENT DOCUMENTS

| | | | |
|---|---|---|---|
| 2011/0016811 A1* | 1/2011 | Kalkanoglu et al. | 52/309.1 |
| 2011/0023380 A1 | 2/2011 | Jacobs et al. | |
| 2011/0056148 A1 | 3/2011 | Jenkins et al. | |
| 2011/0061788 A1* | 3/2011 | Stanley | 156/66 |
| 2011/0088340 A1 | 4/2011 | Stobbe | |
| 2011/0138602 A1* | 6/2011 | Stanley | 29/428 |
| 2011/0162779 A1* | 7/2011 | Stanley | 156/66 |
| 2011/0174365 A1 | 7/2011 | Drake et al. | |
| 2011/0185652 A1 | 8/2011 | Lenox | |
| 2011/0239555 A1 | 10/2011 | Cook et al. | |
| 2011/0240207 A1* | 10/2011 | Stanley | 156/91 |
| 2011/0302859 A1 | 12/2011 | Crasnianski | |
| 2011/0303215 A1 | 12/2011 | Chuang | |
| 2011/0314753 A1 | 12/2011 | Farmer et al. | |
| 2012/0055105 A1 | 3/2012 | Kohl et al. | |
| 2012/0060902 A1 | 3/2012 | Drake | |
| 2012/0067868 A1 | 3/2012 | Casey | |
| 2012/0137600 A1 | 6/2012 | Jenkins | |
| 2012/0186630 A1 | 7/2012 | Jenkins et al. | |
| 2012/0210660 A1 | 8/2012 | Livsey et al. | |
| 2012/0260588 A1 | 10/2012 | Allen | |
| 2013/0118545 A1 | 5/2013 | Bosler et al. | |
| 2013/0160382 A1 | 6/2013 | Schick et al. | |
| 2013/0167455 A1 | 7/2013 | Jenkins et al. | |
| 2013/0174496 A1 | 7/2013 | Lanza | |
| 2013/0186017 A1* | 7/2013 | Kassem | 52/173.3 |
| 2013/0199596 A1 | 8/2013 | Van Niekerk | |
| 2014/0033625 A1* | 2/2014 | Jenkins et al. | 52/173.3 |
| 2014/0083028 A1* | 3/2014 | Richardson | 52/173.3 |
| 2014/0165480 A1* | 6/2014 | Jenkins et al. | 52/173.3 |
| 2014/0173997 A1* | 6/2014 | Jenkins | 52/58 |
| 2014/0259973 A1* | 9/2014 | Duarte et al. | 52/58 |
| 2014/0260035 A1* | 9/2014 | Boss | 52/408 |

* cited by examiner

Bottom color = Black
6" Alum. coil stock

PHOTOVOLTAIC SYSTEMS, METHODS FOR INSTALLING PHOTOVOLTAIC SYSTEMS, AND KITS FOR INSTALLING PHOTOVOLTAIC SYSTEMS

CROSS-REFERENCE TO RELATED APPLICATIONS

This application is a continuation of U.S. patent application Ser. No. 12/730,915, filed Mar. 24, 2010, now U.S. Pat. No. 8,646,228, which claims the priority of U.S. Provisional Patent Application Ser. No. 61/162,950, filed Mar. 24, 2009, each of which is hereby incorporated herein by reference in its entirety.

BACKGROUND OF THE INVENTION

1. Field of the Invention

The present invention relates generally to the photovoltaic generation of electrical energy. The present invention relates more particularly to photovoltaic systems for use in photovoltaically generating electrical energy.

2. Technical Background

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such "photovoltaic cells" are often made from semiconductor-type materials such as doped silicon in either single crystalline, polycrystalline, or amorphous form. The use of photovoltaic cells on roofs is becoming increasingly common, especially as system performance has improved. They can be used to provide at least a significant fraction of the electrical energy needed for a building's overall function; or they can be used to power one or more particular devices, such as exterior lighting systems and well pumps.

Accordingly, research and development attention has turned toward the development of photovoltaic products that are adapted to be installed on a roof. While photovoltaic modules have been in use for some time, they tend to be heavy and bulky, and aesthetically unfavorable when installed on a roof. Roofing products having photovoltaic cells integrated with roofing products such as shingles, shakes or tiles have been proposed. A plurality of such photovoltaic roofing elements (i.e., including photovoltaic media integrated with a roofing product) can be installed together on a roof, and electrically interconnected to form a photovoltaic roofing system that provides both environmental protection and photovoltaic power generation. These can be very advantageous, but can be difficult to install on steep surfaces, and can often result in incomplete coverage of the roof surface with photovoltaic power generation. Moreover, fabrication and installation and connection of a plurality of smaller photovoltaic roofing elements can in some circumstances be a very slow, tedious, and costly process.

SUMMARY OF THE INVENTION

One aspect of the invention is a photovoltaic roofing system disposed on a roof deck having an upper end and a lower end. The photovoltaic roofing system includes:
  one or more photovoltaic elements contiguously disposed on the roof deck, the contiguously-disposed photovoltaic elements together having a top edge facing the upper end of the roof deck, a bottom edge facing the lower end of the roof deck, and two side edges;
  a plurality of roofing elements disposed adjacent the contiguously-disposed photovoltaic elements, along their side edges;
  side flashing disposed along the side edges of the contiguously-disposed photovoltaic elements, the side flashing having a cross-sectional shape comprising a vertically-extending feature and a flange extending from each lateral side at the bottom of the vertically-extending feature, with the flange facing the photovoltaic area being at least partially disposed between a photovoltaic element and the roof deck, and the flange facing away from the photovoltaic area being at least partially disposed between a roofing element and the roof deck.

Another aspect of the invention is a method for installing a photovoltaic roofing system according to any of the preceding claims onto a roof comprising a roof deck having an upper end and a lower end. The method includes:
  disposing side flashing along the side edges of the photovoltaic area, the side flashing having a cross-sectional shape comprising a vertically-extending feature and a flange extending from each lateral side at the bottom of the vertically-extending feature, with the flange facing away from the photovoltaic area being at least partially disposed between a roofing element disposed along the side edges of the photovoltaic area and the roof deck; and
  contiguously disposing one or more photovoltaic elements in the photovoltaic area, with the flange of the side flashing facing the photovoltaic area being at least partially disposed between a photovoltaic element and the roof deck.

Another aspect of the invention is a kit for the installation of a photovoltaic roofing system. The kit includes:
  one or more photovoltaic elements; and
  a plurality of side flashings, each having a cross-sectional shape comprising a vertically-extending feature and a flange extending from each lateral side at the bottom of the vertically-extending feature.

Another aspect of the invention is a kit for the installation of a photovoltaic roofing system. The kit is for use with one or more contiguously-disposed photovoltaic elements, and includes:
  a plurality of side flashings, each having a cross-sectional shape comprising a vertically-extending feature and a flange extending from each lateral side at the bottom of the vertically-extending feature;
  one or more top flashings; and
  one or more bottom flashings,
wherein the side flashings, the one or more top flashings and the one or more bottom flashings are sufficient length to enclose a photovoltaic area defined by the contiguously-disposed photovoltaic elements.

Another aspect of the invention is a flashing system including a lineal flashing having a vertically-extending portion, a flange extending from the bottom of one side of the vertically-extending portion, and a downward-facing recess formed in the vertically-extending portion on its face opposing the flange; and a plurality of step flashings each having a length substantially shorter than that of the lineal flashing, and each including a vertically-extending portion and a flange extending from the bottom thereof, with the vertically-extending portion of each step flashing being configured to fit within the downward-facing recess of the lineal flashing.

BRIEF DESCRIPTION OF THE DRAWINGS

The accompanying drawings are not necessarily to scale, and sizes of various elements can be distorted for clarity.

DETAILED DESCRIPTION OF THE INVENTION

One aspect of the invention provides a photovoltaic roofing system disposed on a roof deck having an upper end and a lower end. The photovoltaic roofing system includes one or more photovoltaic elements contiguously disposed on the roof deck, the contiguously-disposed photovoltaic elements together having a top edge facing the upper end of the roof deck, a bottom edge facing the lower end of the roof deck, and two side edges; a plurality of roofing elements disposed adjacent the contiguously-disposed photovoltaic elements, along their side edges; side flashing disposed along the side edges of the contiguously-disposed photovoltaic elements, the side flashing having a cross-sectional shape including a vertically-extending feature and a flange extending from each lateral side at the bottom of the vertically-extending feature, with the flange facing the photovoltaic area being at least partially disposed between a photovoltaic element and the roof deck, and the flange facing away from the photovoltaic area being at least partially disposed between a roofing element and the roof deck.

Figure 1:
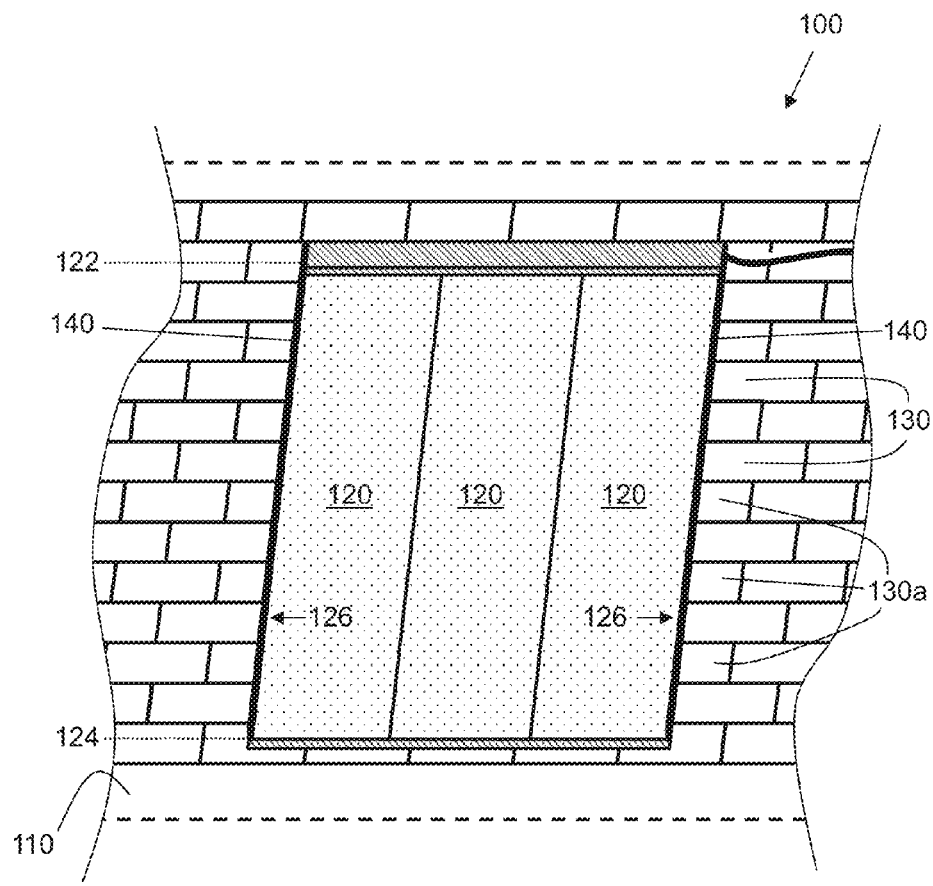
FIG. 1 is a schematic top perspective view of a photovoltaic roofing system according to one embodiment of the invention.

One embodiment of the invention is shown in schematic top perspective view in FIG. 1. Photovoltaic roofing system 100 includes a roof deck 110, upon which one or more (in this case, three) photovoltaic elements 120 are disposed. The one or more photovoltaic elements (together) have a top edge 122 facing the upper end of the roof deck; a bottom edge 124 facing the lower end of the roof deck, and two side edges 126. The photovoltaic roofing system also includes a plurality of roofing elements 130 disposed outside the photovoltaic area, along their side edges 126. In this embodiment, the roofing elements are granule-coated bituminous shingles. Of course, as described below, other types of roofing elements can be used in the present invention. In order to provide a desired overlap pattern of the roofing elements, it may be necessary to cut certain of the roofing elements (e.g., roofing elements 130a) or otherwise provide roofing elements of different widths. Photovoltaic roofing system 100 also includes linearly-extending side flashing 140 disposed along the side edges of the contiguously-disposed photovoltaic elements.

The present invention can be used in conjunction with a variety of types of roofing elements. For example, in one embodiment the roofing elements are bituminous shingles. In other embodiments, the roofing elements are formed from slate, tile, composite, polymer, or metal. Virtually any design of roofing element can be used in practicing the present invention. For example, any suitable shingle shape can be used, including standard three-tab shingles as well as architectural shingles of various thicknesses and designs. Various tile shapes, such as flat tiles and wavy tiles can be used.

The present invention can provide a number of advantages over conventional photovoltaic installations. For example, when using traditional photovoltaic panels, bolts must be driven through the roof (and through the roofing elements protecting the roof) in order to hold the panels in place, which can create the potential for leakage. In many cases, the bolts must be driven through the framing members of the roof, in order to provide sufficient anchoring for the relatively bulky photovoltaic panels. In certain embodiments of the present invention, there is no need for bolts through the roof, or through any roofing elements. Fasteners are often used to hold the flashing in place, but such fasteners can be covered by the roofing elements and photovoltaic elements disposed on the flashing. Accordingly, in one embodiment of the invention, all fasteners holding the components of the photovoltaic roofing system in place are covered by roofing elements, photovoltaic elements or flashing disposed thereon. Moreover, roof penetrations for electrical connections can be minimized with respect to conventional systems.

Figure 2:
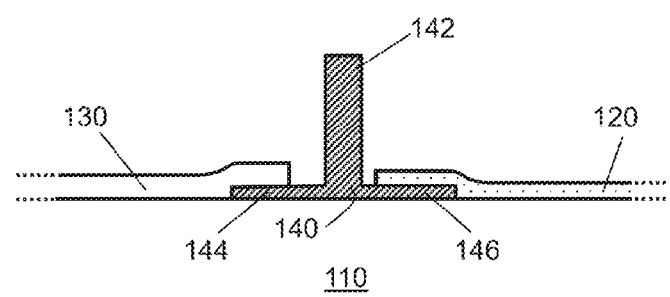
FIG. 2 is a partial schematic cross-sectional view of a side flashing in accordance with one embodiment of the invention.

The side flashing of the embodiment of FIG. 1 is shown in more detail in the partial cross-sectional view of FIG. 2. The side flashing 140 has a cross sectional shape including a vertically-extending feature 142 and a flange (144, 146) extending from each lateral side at the bottom of the vertically-extending feature. The flange 146 facing the contiguously-disposed photovoltaic elements is at least partially disposed between the photovoltaic element 120 and roof deck 110. The flange 144 facing away from the contiguously-disposed photovoltaic elements is at least partially disposed between the roofing element 130 and roof deck 110. The side flashing can thereby provide a water resistant seam between the contiguously-disposed photovoltaic elements and the roofing elements. If the photovoltaic element has an adhesive on its bottom surface (as do many commercially-available photovoltaic elements, such as those available from Uni-Solar), the adhesive can in certain embodiments adhere the photovoltaic element to the photovoltaic element-facing flange of the flashing. Alternatively, a separate adhesive can be used. Similarly, in some embodiments, an adhesive can be used to affix the roofing elements to the side flashing. Importantly, the side flashing and its interaction with roofing elements and the photovoltaic elements can in certain embodiments make the interface between the roofing elements and the photovoltaic elements essentially waterproof.

Figure 3:
FIG. 3 is a set of partial schematic cross-sectional views of examples of hemmed returns for use on flashings in accordance with certain embodiments of the invention.

The flashings used in the present invention can be formed from a variety of materials. For example, the flashing can be formed from metal, for example from metal strips folded or bent with a metal bender or brake. In other embodiments, the flashing is formed from a polymer material (e.g., PVC, vinyl, polycarbonate), or from a polymer-coated material. In certain embodiments, the flashing is nonconductive, so that it cannot be electrified in cases of failure or mis-wiring. Of course, conductive flashings can also be used; in such cases, as the skilled artisan will appreciate, it may be desirable to electrically ground them. One or more ends of the flashing pieces can be formed with a hemmed return, several examples of which are shown in partial cross-sectional view in FIG. 3. The hemmed return can, for example, be formed with a single fold of material, for example as shown in the left and center examples of FIG. 3. In other embodiments, two folds of material are used to make the hemmed return (e.g., with one fold inside the others in a spiraling fashion, as shown in the rightmost example of FIG. 3). The hemmed return can help prevent water ingress under the flashing by capillary action, and can also provide rigidity to the structure.

Linearly extending flashings for use as side flashing, bottom flashing and top flashing in the present invention can have lengths, for example, greater than about 0.5 m (about 19.7 inches), greater than about 1 m (about 39.4 inches), or even greater than about 2 m (about 78.7 inches), and can be trimmed and/or combined (e.g., in an overlapping fashion) to fit the appropriate edge of the contiguously-disposed photovoltaic elements.

Flashings can be affixed to the roof deck using fasteners (e.g., roofing nails or wood screws), or using other methods known in the art. Fasteners can be positioned so that they are covered by the photovoltaic elements and the roofing elements disposed on the flanges of the flashing. Fasteners can be positioned, for example, at least about 1" in from the edge, and/or at least 1" in from a vertically-extending element. When a hemmed return is about 1" in width, the fastener can be positioned immediately adjacent to the hemmed return. Fastener heads can be caulked. Flashings can in certain embodiments be made as rigid formed pieces with one or more of the flanges having flexible portions, for example in nailing zones disposed along the length of the flashing. Use of flexible nailing zones can provide stress relief as the relatively long pieces of flashing expand and contract relative to the roof surface to which they are nailed. Slotted nailing cutouts, similar as those used in vinyl siding, can also be used. In certain embodiments, the flashing can be flexible along its length, for example to be useable on a curved roof surface.

Figure 4:
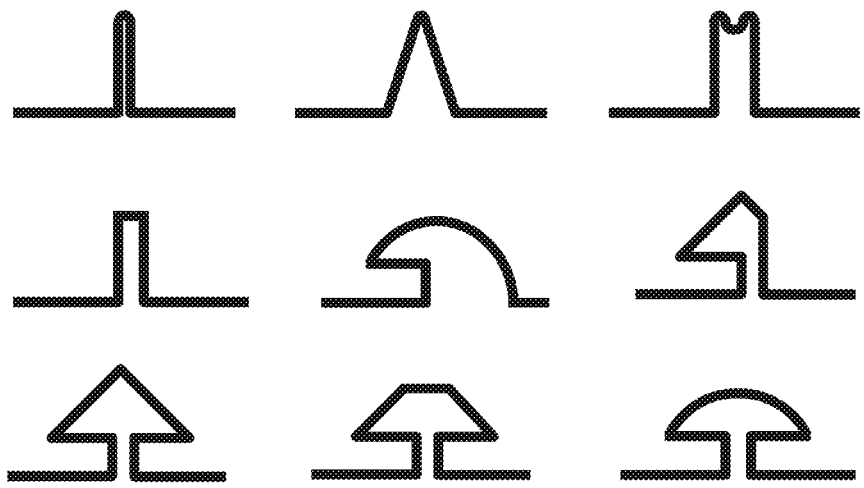
FIG. 4 is a set of partial schematic cross-sectional views of side flashings in accordance with certain embodiments of the invention.

The side flashing can be provided, for example, in strip form, and can have a variety of cross-sectional shapes. A variety of possible shapes are shown in FIG. 4. The cross-sectional shapes provided in FIG. 4 are shown as being formed from bent metal; the skilled artisan can adapt these shapes for use with other manufacturing processes, such as extrusion. Bent metal flashings can be formed with a hemmed return as described above. The side flashing can be formed from a material colored to complement or match the color of the roofing elements, or can be so coated, printed or painted. The side flashing can also be printed with a pattern or text. In certain embodiments, the side flashing is formed to present an increased surface area to an observer, for example as shown in the bottom three cross-sectional shapes of FIG. 4. There can, for example, be a curved surface presented as shown in the center and bottom right cross-sectional shapes of FIG. 4.

In certain embodiments, the side flashing includes a recessed insertion area formed in the vertically-extending feature, so as to overhang at least one of the flanges. For example, as shown in the center right cross-sectional shape of FIG. 4, the left-facing flange (e.g., the flange facing toward the roofing elements) has a recessed insertion point. A roofing element can be at least partially disposed in the recessed insertion area, with the material of the vertically-extending feature forming an overhang that protects the interface of the roofing element and the flange. The use of a recessed insertion area can provide added protection from the elements. The use of a recessed insertion area can also provide an aesthetic benefit, as it can hide the cut edge of a roofing element cut to fit the border of the contiguously-disposed photovoltaic elements. In other embodiments, a recessed insertion area is provided on both sides of the side flashing. The side flashings of FIG. 4 are shown as being formed of a unitary piece; multiple pieces can be linearly arranged (e.g., with slight overlap) should a single piece not be long enough to border a given set of contiguously-disposed photovoltaic elements. Overlappingly arranged side flashings can be, for example, sealed together with roofing adhesive.

Figure 5:
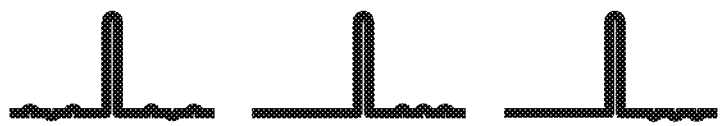
FIGS. 5 and 6 are sets of partial schematic cross-sectional views of flashings in accordance with certain embodiments of the invention.

In certain embodiments, the flange of at least one of the flashings can have small ridges and/or channels formed thereon (e.g., on one side, such as the photovoltaic element-facing side, or both), as shown in cross-sectional perspective view in FIG. 5. The ridges and/or channels can help to direct any entrained moisture from a joint, thereby increasing weather resistance of the roof. The ridges and/or channels may be provided, for example, as continuous features along the length of the flashing, or in other embodiments as interrupted but overlapping diagonal features (e.g., that themselves can be continuous or discontinuous). Ridges and/or channels can help keep any water that gets beneath the roofing elements and/or photovoltaic elements entrained along the flashing and direct it down the roof for collection at the bottom edge of the roof deck.

Figure 6:
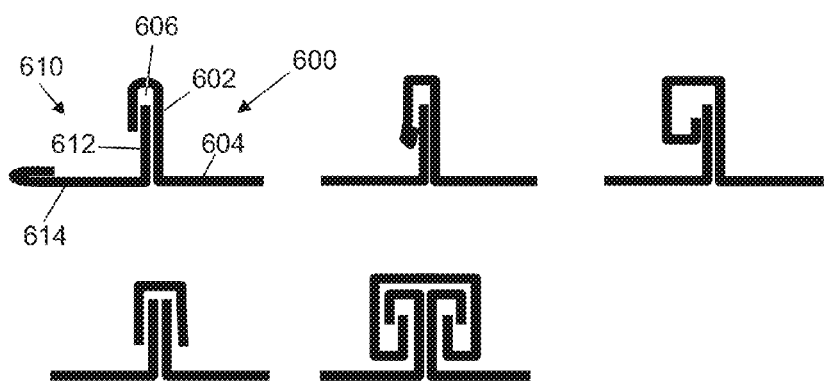

In certain embodiments, a length of flashing is provided as a plurality of laterally-disposed pieces, for example as shown in schematic cross-sectional view FIG. 6. For example, as shown in the top right example of FIG. 6, the side flashing can be formed from two linear pieces that interlock. This can be advantageous, as photovoltaic element-facing and roofing element-facing flashing components can be appropriately selected, then combined (e.g., during installation). Moreover, separate pieces can allow for expansion and contraction without distortion of the flashing. Desirably, the interlocking pieces are arranged to be relatively water-resistant, as shown in FIG. 6. Other examples of 2-, and even 3-piece lengths of flashings are shown in cross-sectional view in FIG. 6. The 2- and 3-piece flashings can in certain embodiments provide a recessed insertion area (see, e.g., upper right and lower center examples of FIG. 6). Three-piece flashings can be made to interlock (see, e.g., lower center example), or alternatively can be held together with a fastener (e.g., a nail) or an adhesive. In certain embodiments, individual pieces of multiple piece side flashings are not rigidly affixed to one another, so that the pieces can move relative to one another.

In some embodiments, the side flashing can include one or more continuous pieces of flashing on the side facing the photovoltaic elements, and a plurality of stepped side flashing pieces on the side facing the roofing elements. The stepped flashing can be interleaved with the roofing elements along the side edge of the contiguously-disposed photovoltaic elements, as is conventional for the use of step flashing with roofing elements such as roofing shingles, and as is shown in FIG. 6. For example, referring to the top left example of FIG. 6, the continuous piece of flashing can be the right-side piece 600, which has a vertically-extending portion 602, a flange 604 extending from the bottom of one side of the vertically-extending portion, and a downward-facing recess 606 formed in the vertically-extending portion on its face opposing the flange 604. The step flashing can be the left-side piece 610, which has a vertically-extending portion 612 and a flange 614 extending from one side of the bottom of the vertically-extending portion. The vertically-extending portion 612 of the step flashing is configured to fit within the downward-facing recess 606 of the continuous piece of flashing. Accordingly, another aspect of the invention is a flashing system including a lineal flashing having a vertically-extending portion, a flange extending from the bottom of one side of the vertically-extending portion, and a downward-facing recess formed in the vertically-extending portion on its face opposing the flange; and a plurality of step flashings each having a length substantially shorter than that of the lineal flashing, and each including a vertically-extending portion and a flange extending from the bottom thereof, with the vertically-extending portion of each step flashing being configured to fit within the downward-facing recess of the lineal flashing. For example, the lineal flashing can have a raised vertical portion formed from a sheet material (e.g., metal) that goes up, then returns down upon itself with a hemmed return, as shown in the top center example of FIG. 6. The use of stepped flashing can help to accommodate deck movement and expansion/contraction of materials, acting as a stress relief while maintaining water resistance (e.g., by fitting into the downward-facing recess of a lineal side flashing). The use of stepped side flashing pieces is shown in more detail in Example 1.

Of course, in other embodiments, lineal flashing can be formed from interlocking continuous elements, e.g., as shown in the top left example of FIG. 6. In this example, the roofing elements would be on the left side of the flashing, optionally with adhesive affixing the roofing elements to the flange of the flashing.

Figure 7:
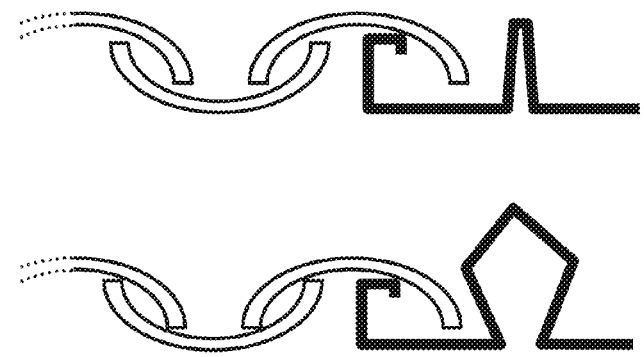
FIG. 7 is a pair of schematic cross-sectional views of side flashings useable with barrel tiles according to one embodiment of the invention.

Single-piece side flashings for use with curved roofing elements (e.g., curved roofing tile such as Spanish style "barrel tiles") are shown in cross-sectional schematic view FIG. 7. The person of skill in the art can adapt similar designs for use with 2- and 3-piece flashings.

The photovoltaic elements can be, for example, flexible photovoltaic elements, such as the flexible photovoltaic laminates sold by United Solar Ovonic (Uni-Solar) under the product designation PVL (e.g., PVL-68). PVL-68 laminates include a lengthwise extending plurality of electrically-interconnected photovoltaic cells. Of course, other photovoltaic elements can be used. In certain embodiments, the photovoltaic elements can be wider, for example with an array having more than one cell along the width of the laminate, and a plurality of cells extending along the length of the laminate.

In one embodiment, the photovoltaic elements are flexible photovoltaic elements that have a generally strip-like shape (e.g., widths in the range of 0.3 m-0.7 m (11.8 inches to 27.6 inches), and lengths of greater than 1 m (about 39.4 inches)), with the strips being oriented so that they run in a direction from the top edge of the photovoltaic area to the bottom edge of the photovoltaic area. In certain embodiments, the photovoltaic elements have at least one dimension greater than 1 m (about 39.4 inches). For example, the photovoltaic element can have at least one dimension greater than 1 m (about 39.4 inches), and another dimension greater than 0.5 m (about 19.7 inches), 0.7 m (about 27.6 inches), or even 1 m (about 39.4 inches). Wider laminates can reduce application time and reduce the number of standing seam flashings in the final system.

Multiple photovoltaic elements can be disposed in the photovoltaic area (e.g., as a linear array of strip-shaped elements). They can be, for example, butted against one another, or slightly overlapping (e.g., so that photovoltaically-active areas are not covered; for example, the PVL-68 laminate has about an inch of photovoltaically-inactive area around its periphery). In certain embodiments, and as described below in more detail with respect to FIG. 9, the photovoltaic system can include flashing disposed at the interfaces between adjacent contiguously-disposed photovoltaic elements. In certain embodiments, no metal sheet (or "pan") is disposed between substantially the entire area of the photovoltaic elements and the roof deck; rather, the photovoltaic elements can be used without metal sheeting underlying the photovoltaic elements. In certain embodiments, one or more snowguards can be installed at the bottom edge of the photovoltaic elements, to help prevent the catastrophic release of a great quantity of accumulated snow or ice.

The photovoltaic elements can, in certain embodiments, have an adhesive layer on their bottom surfaces (for example, accessible by removing a removable release liner). The adhesive can adhere to the top surface of the roof deck (e.g., directly to the wood of the deck or to an underlayment layer). One example of a possible underlayment material is an ice and water shield (e.g., a modified bituminous material such as WinterGuard® HT available from CertainTeed Corporation). Alternatively, a separate layer of a material can be disposed on the roof deck in the photovoltaic area, and the adhesive layer can adhere to the material. The material can be, for example, a roofing membrane (e.g., formed from thermoplastic polyolefin (TPO), PVC, EPDM, a bituminous material, or a modified bituminous material, e.g., WinterGuard® HT available from CertainTeed Corp.), or an underlayment material (e.g., synthetic underlayments, saturated underlayments). Moreover, the adhesive material can adhere to the flanges of flashing (both the side flashing and any flashing disposed between contiguously-disposed photovoltaic elements in the photovoltaic area). When photovoltaic elements are disposed in an overlapping fashion, the adhesive can adhere the bottom surface of a photovoltaic element to the top surface of the adjacent photovoltaic element. In other embodiments, a separate adhesive or sealant can be used to seal the seam between adjacent photovoltaic elements. In some embodiments, it may be desirable to use an adhesion promoter to improve adhesion between any adhesive or sealant to adjacent photovoltaic elements.

Figure 8:
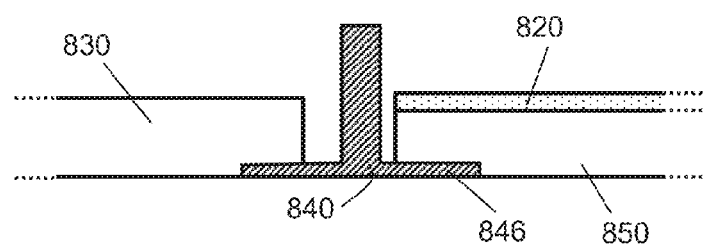
FIG. 8 is a partial schematic cross-sectional view of a photovoltaic roofing system including a panel according to one embodiment of the invention.

In certain embodiments, a panel can be disposed between the photovoltaic element(s) and the roof deck to raise the apparent level of the photovoltaic element surfaces, for example for increased aesthetic appeal. The edges of the panel can be disposed between the edges of the photovoltaic elements and the side flashings on which they are disposed. Any flashings disposed between adjacent photovoltaic elements (i.e., as described below with respect to FIG. 9) can be disposed on top of the panel. The panel can be, for example, formed from plywood, or a plastic or composite material. In certain embodiments, the panel can be formed from a thermally insulating material (e.g., foam board). In certain embodiments, the panel is non-metallic. In certain embodiments, the panel is formed with channels or voids, to allow air to flow through the board and provide cooling for the photovoltaic elements. In certain embodiments, the panel is at least 2 mm (0.078 inches), at least 4 mm (0.157 inches), or even at least 6 mm (0.236 inches) in thickness. Such panels are described, for example, in U.S. patent application Ser. No. 12/265,822, which is hereby incorporated herein by reference in its entirety. An example of a photovoltaic roofing system including a panel is shown in partial schematic cross-sectional view in FIG. 8. This example is similar to the example of FIG. 2, but the roofing element 830 is relatively thick. A panel 850 is disposed underneath the photovoltaic element 820 to raise its top surface to be relatively even with that of the roofing element. In this embodiment, the panel 850 sits on top of the photovoltaic area-facing flange 846 of the side flashing 840. Other configurations are possible. For example, the side flashing can be configured so that its photovoltaic-area facing flange sits on top of the panel.

Figure 9:
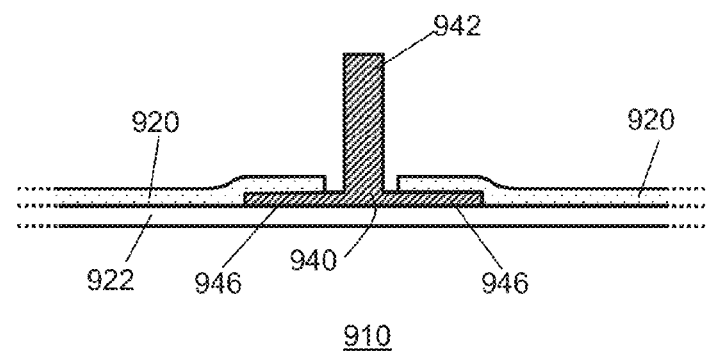
FIG. 9 is a partial schematic cross-sectional view of a photovoltaic roofing system including a panel according to one embodiment of the invention.

In some embodiments, for example as shown in FIG. 9, flashing 940 can be disposed beneath the edges of adjacent photovoltaic element strips 920. For example, the flashing can be standing seam flashing, having a cross-sectional shape including a vertically-extending feature 942, with flanges 946 extending from each side at the bottom of the structure, for example as shown in FIG. 9. Each flange is disposed between a photovoltaic element and the roof deck. In the example of FIG. 9, a roofing membrane 922 is disposed between the roof deck 910 and the photovoltaic elements 920. An adhesive (e.g., one provided on the bottom of the photovoltaic element, or a separate adhesive) can be used in some embodiments to adhere the photovoltaic elements to the flanges. In other embodiments, the flashing between adjacent contiguously-disposed photovoltaic elements can be substantially flat. The use of flashing can aid in installation, as the flashing can allow some for a small amount of space between the contiguously-disposed photovoltaic elements, and therefore make less critical the measurement of the area upon which the contiguously-disposed photovoltaic elements are disposed.

At the bottom edge of the photovoltaic area, the photovoltaic elements can overlap an underlying course of roofing elements, as shown in FIG. 1.

Figure 10:
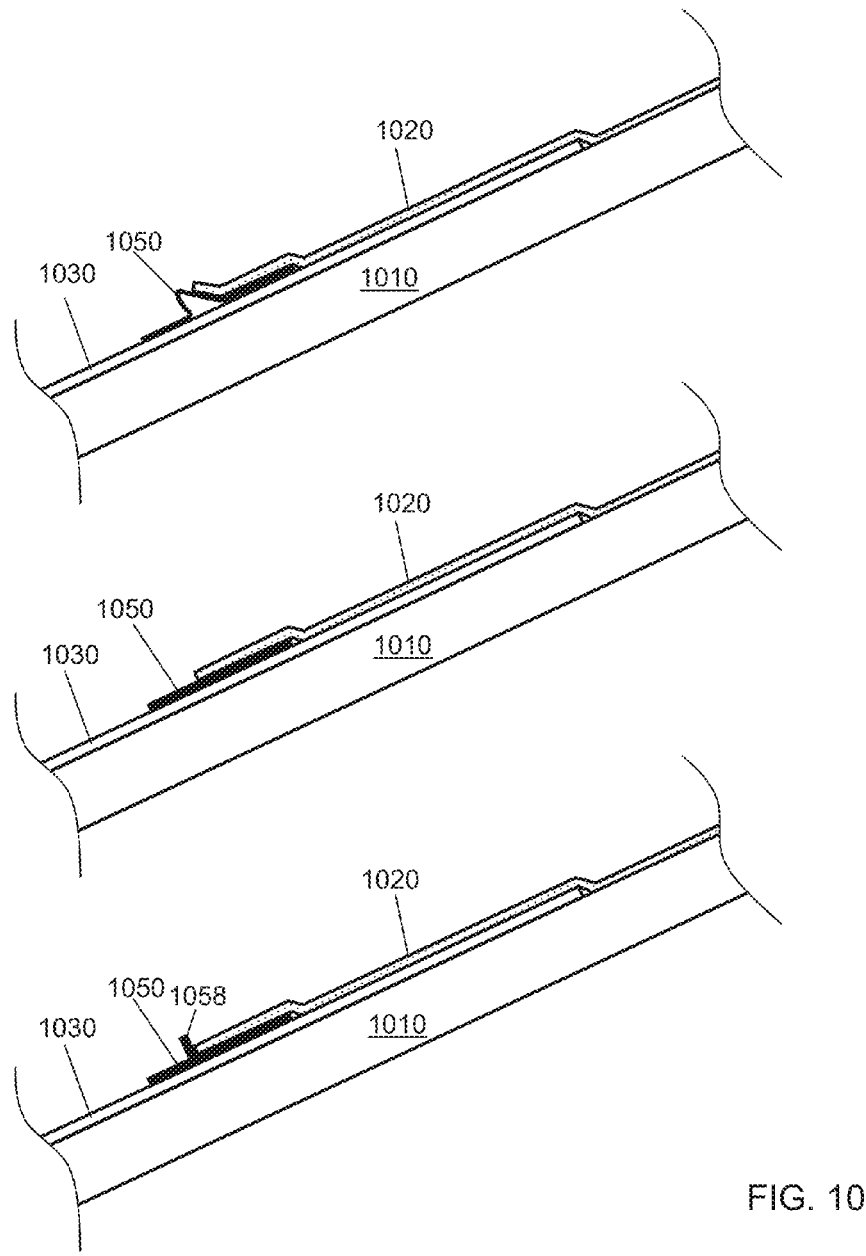
FIG. 10 is a set of schematic cross sectional views of bottom flashings according to certain embodiments of the invention.

In certain embodiments of the invention, the photovoltaic roofing system includes a bottom flashing disposed along the bottom edge of the photovoltaic area. The bottom flashing can be disposed at least partially disposed underneath the one or more photovoltaic elements and at least partially on top of a roofing element disposed along the bottom edge of the photovoltaic area. The bottom flashing can be shaped generally similar to the side flashing described above. For example, the bottom flashing can have a cross-sectional shape including a vertically-extending feature and a flange extending from each lateral side at the bottom of the vertically-extending feature, with the flange facing the photovoltaic area being disposed at least partially underneath the one or more photovoltaic elements, and the flange facing away from the photovoltaic area being disposed at least partially on top of a roofing element disposed along the bottom edge of the photovoltaic area. In certain embodiments will have a generally lower profile vertically-extending feature. In other embodiments, the bottom flashing is generally flat (and can optionally have a hemmed return as described above, for example at the end facing the lower edge of the roof deck). Examples of cross-sectional shapes for the bottom flashing 1050, as installed on roof deck 1010 with photovoltaic element 1020 and an underlying roofing element 1030. The bottom example of FIG. 10 includes a vertically-extending feature 1058. Vertically-extending features can be continuous along the bottom flashing, or can be discontinuous, or continuous with holes or slots formed therethrough to allow water to pass. The vertically-extending feature can act as a snowguard to help prevent the catastrophic release of a great quantity of accumulated snow or ice. The bottom flashing can be disposed, for example, on the underlying course of roofing elements, as shown in FIGS. 1 and 5.

The photovoltaic elements can have their edges disposed on the flange of the bottom flashing facing the upper end of the roof deck. When the photovoltaic elements have an adhesive on their bottom surface, they can adhere to the top surface of the bottom flashing; in other embodiments, a separate adhesive can be used to adhere the photovoltaic element to the bottom flashing. Adherence of the photovoltaic element to the bottom flashing can help to keep water from blowing up and under the photovoltaic element, and thereby improve waterproofness of the system.

In certain embodiments, the bottom flashing is substantially hidden (i.e., covered) by the overlaying photovoltaic elements (e.g., with less than about 1", or even less than about 0.5" exposure). In other embodiments, the bottom flashing has a raised profile, or a relatively large exposure width, so as to provide a visual border between the contiguously-disposed photovoltaic elements and the underlying roofing elements.

In certain embodiments, the side flashing and the bottom flashing meet at a corner, where the photovoltaic area-facing flange of the side flashing can be at least partially disposed on top of the bottom flashing (e.g., the flange of the bottom flashing facing the upper end of the roof deck).

Figure 11:
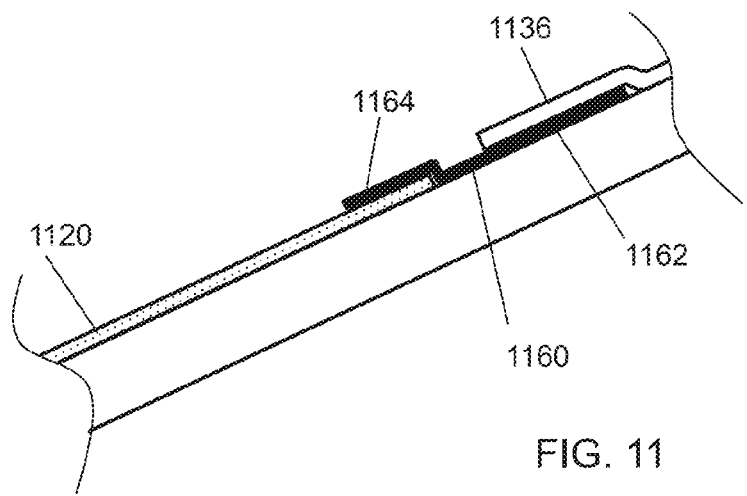
FIGS. 11-13 are schematic cross sectional views of top flashings according to certain embodiments of the invention.

In certain embodiments, the photovoltaic roofing system includes a top flashing disposed along the top edge of the photovoltaic area. The top flashing can be arranged as shown schematically in FIG. 11. The top flashing 1160 can have a flange 1162 (facing the upper end of the roof deck) that is disposed underneath a roofing element 1136 disposed along the top edge of the photovoltaic area; and a section 1164 (facing the lower end of the roof deck) that is disposed on top of the photovoltaic element 1120. In the embodiment shown in FIG. 11, the top flashing is substantially flat; in other embodiments, it can include a vertically-extending feature as described above. In this embodiment, the top flashing can include openings for electrical features such as cables, terminals or junction boxes; sealant can be used to seal any such openings to provide water resistance. When multiple top flashings are overlappingly linearly arranged across the top edge of the photovoltaic area, in some embodiments it can be desirable to seal the joints between laterally adjacent pieces of the top flashing with weather resistant tape. Such tape can have adhesive on one or both sides, and may be available in various thicknesses, widths and lengths (e.g., available under the trade name ETERNIT SURE WELD).

Figure 12:
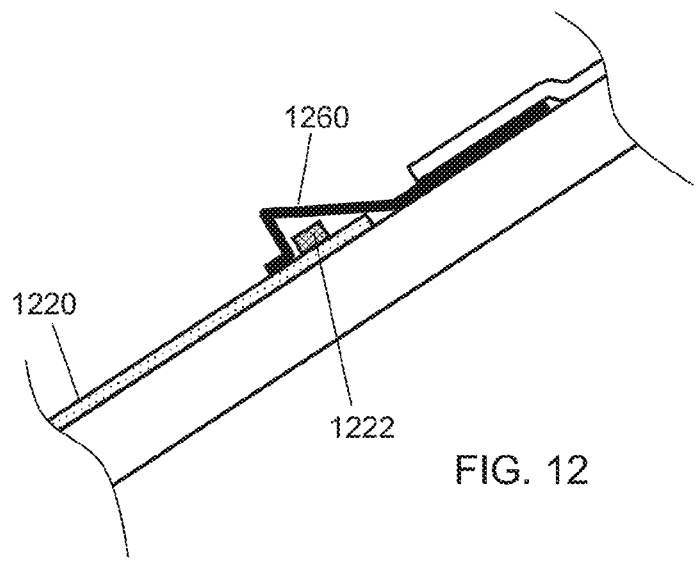

In certain embodiments, the top flashing can include one or more cavities and/or recesses that act as a cover and/or conduit for electrical connectors or cables or other electrical features that protrude from the surface of the photovoltaic elements at their top edges. For example, a top flashing 1260 according to one such embodiment is shown in schematic cross-sectional view in FIG. 12, in which photovoltaic element 1220 includes junction box 1222, which is protected by top flashing 1260. Cables that connect the junction boxes of adjacent photovoltaic elements to one another and to an electrical system can also be protected by the top flashing. Electrical wiring or cabling can emerge from the cover and/or conduit, and routed across (or through) the roof and to an inverter system for interconnection into a larger electrical system. The cabling can be routed through a decorative trim conduit, such as that described in U.S. patent application Ser. No. 12/145,234, which is hereby incorporated by reference in its entirety.

Figure 13:
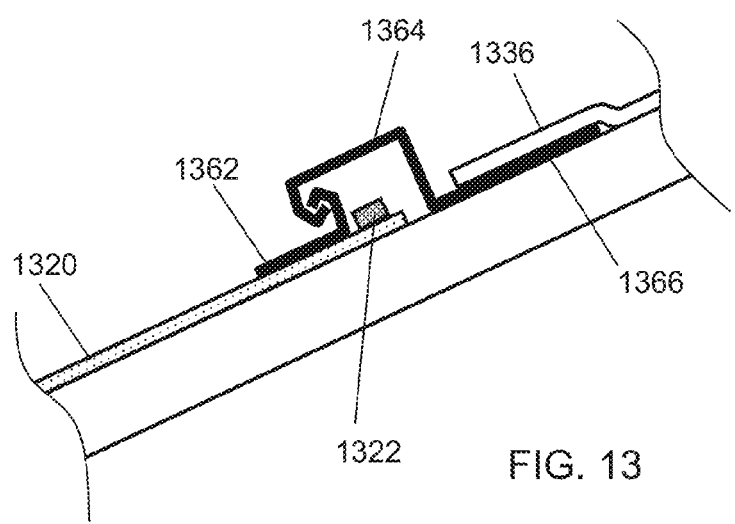

In certain embodiments, a separate base piece disposed on the one or more photovoltaic elements and used, for example, to anchor the top flashing to their surfaces. For example, as shown in FIG. 13, base piece 1362 is disposed on the photovoltaic element 1320, and top flashing piece 1364 covers the electrical feature 1322, and includes flange 1366 that is disposed under overlying roofing element 1336. The two pieces can interlock; and the top piece can be spring-loaded or bendable (e.g., through use of relatively flexible materials) so as to allow the cover/conduit to be accessed. In other embodiments, some other connection feature is used to connect the two pieces (e.g., fasteners, snap-fits, straps, etc.). The base piece can be affixed using fasteners (through a template designed such that the fasteners do not pierce an important part of the photovoltaic element. The base piece can also be held with an adhesive (e.g., double-sided tape). Alternatively, top flashing can be used without a separate base piece.

In certain embodiments, the photovoltaic roofing systems of the present invention are disposed on a roof having a slope of at least about 4/12.

Another aspect of the invention is a method for installing a photovoltaic roofing system as described above. The method includes disposing side flashing along the side edges of the photovoltaic area, the side flashing having a cross-sectional shape including a vertically-extending feature and a flange extending from each lateral side at the bottom of the vertically-extending feature, with the flange facing away from the photovoltaic area being at least partially disposed between a roofing element disposed along the side edges of the photovoltaic area and the roof deck; and contiguously disposing one or more photovoltaic elements in the photovoltaic area, with the flange of the side flashing facing the photovoltaic area being at least partially disposed between a photovoltaic element and the roof deck. The various system elements can be arranged and configured as described hereinabove. The method can, in some embodiments, further include disposing a bottom flashing along the bottom edge of the photovoltaic area, at least partially underneath the one or more photovoltaic elements and at least partially on top of a roofing element disposed along the bottom edge of the photovoltaic area, as described above. Similarly, in certain embodiments, the method further includes disposing a top flashing along the top edge of the photovoltaic area, at least partially under a roofing element disposed along the top edge of the photovoltaic area, and at least partially over the one or more photovoltaic elements, as described above. Flashings can be disposed between contiguously-disposed photovoltaic elements, as described above.

For example, in one embodiment, the invention provides a method for retrofitting an existing roof (including roofing elements arrayed on a roof deck having an upper end and a lower end) with a photovoltaic roofing system. The method includes, before performing any of the steps described above, removing a plurality of roofing elements disposed within an area surrounding the photovoltaic area. During or after installation of the various flashings, roofing elements can be filled in the area of removed roofing elements that is larger than the photovoltaic area, at least partially covering the parts of the flashings facing away from the photovoltaic area. Roofing elements can be cut to fit as necessary. In some instances, the leftover removed roofing elements that are removed can be saved and used to replace failed roofing elements on other parts of the roof.

The steps described above can be performed in any convenient order. For example, the side flashing can be installed before, after, or in conjunction with the installation of the photovoltaic elements. The method can also include the use of other materials, as described above. A roofing membrane can be disposed on the roof deck before installing the photovoltaic elements, as described above.

In certain embodiments, removing the plurality of roofing elements includes cutting one or more of the roofing elements disposed along the side edges of the photovoltaic area, so as to provide the photovoltaic area (i.e., the area devoid of roofing elements) with generally linear side edges. This step may be desirable, for example, when the roofing elements are disposed in laterally-offset courses, such as is common in the roofing arts. In such embodiments, there may be no need to fill back in roofing elements after installation of the side flashing, as a linear edge to interface with the flashing is already provided.

Another aspect of the invention is a kit for the installation of a photovoltaic roofing system as described hereinabove, the kit including one or more photovoltaic elements, a plurality of side flashings as described above, and optionally one or more top flashings as described above and/or one or more bottom flashings as described above. The flashings are desirably sufficient in length to be used along substantially the entire edge(s) of a photovoltaic area defined by the photovoltaic elements as contiguously-disposed on a roof For example, in one embodiment, the side flashings are sufficient in length to border substantially the entire lateral edges of a photovoltaic area defined by the photovoltaic elements as contiguously-disposed on a roof.

Another aspect of the invention is a kit for the installation of a photovoltaic roofing system as described hereinabove, in conjunction with one or more photovoltaic elements, the kit including a plurality of side flashings as described above, one or more top flashings as described above and one or more bottom flashings as described above. The flashings are desirably sufficient in length to be used along substantially the entire edge(s) of the photovoltaic elements as disposed on a roof The kit can, in some embodiments, further include the one or more photovoltaic elements, as described above. The flashings can be selected to be of sufficient length to enclose a photovoltaic area defined by the contiguously-disposed photovoltaic elements.

Electrical connectors and/or cables can also be provided. Instructions for installation can also be provided. The kits can further include a screw penetration template.

Figure 14:
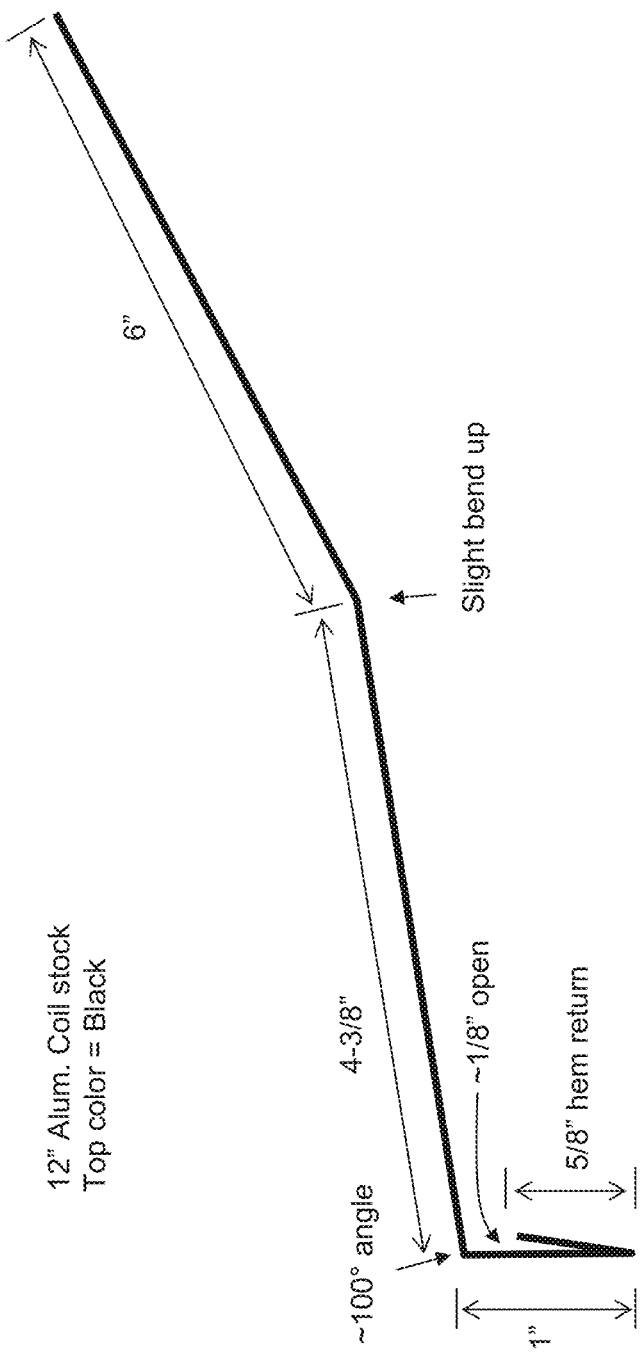
FIGS. 14-18 are schematic cross-sectional views of a set of schematic cross-sectional views of a set of flashings suitable for use in various aspects of the invention.
Figure 15:
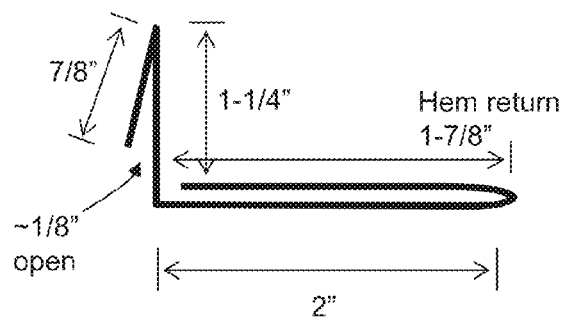
Figure 16:
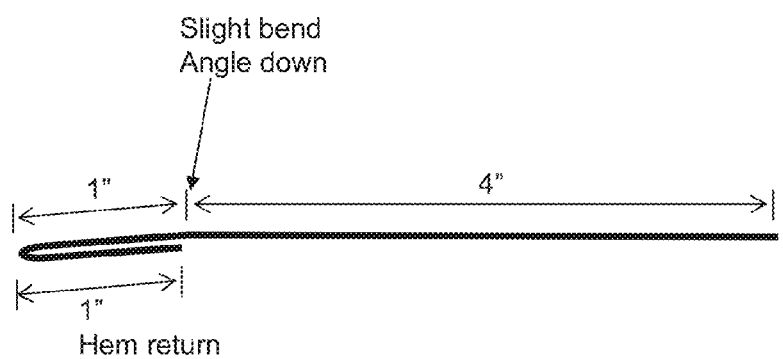
Figure 17:
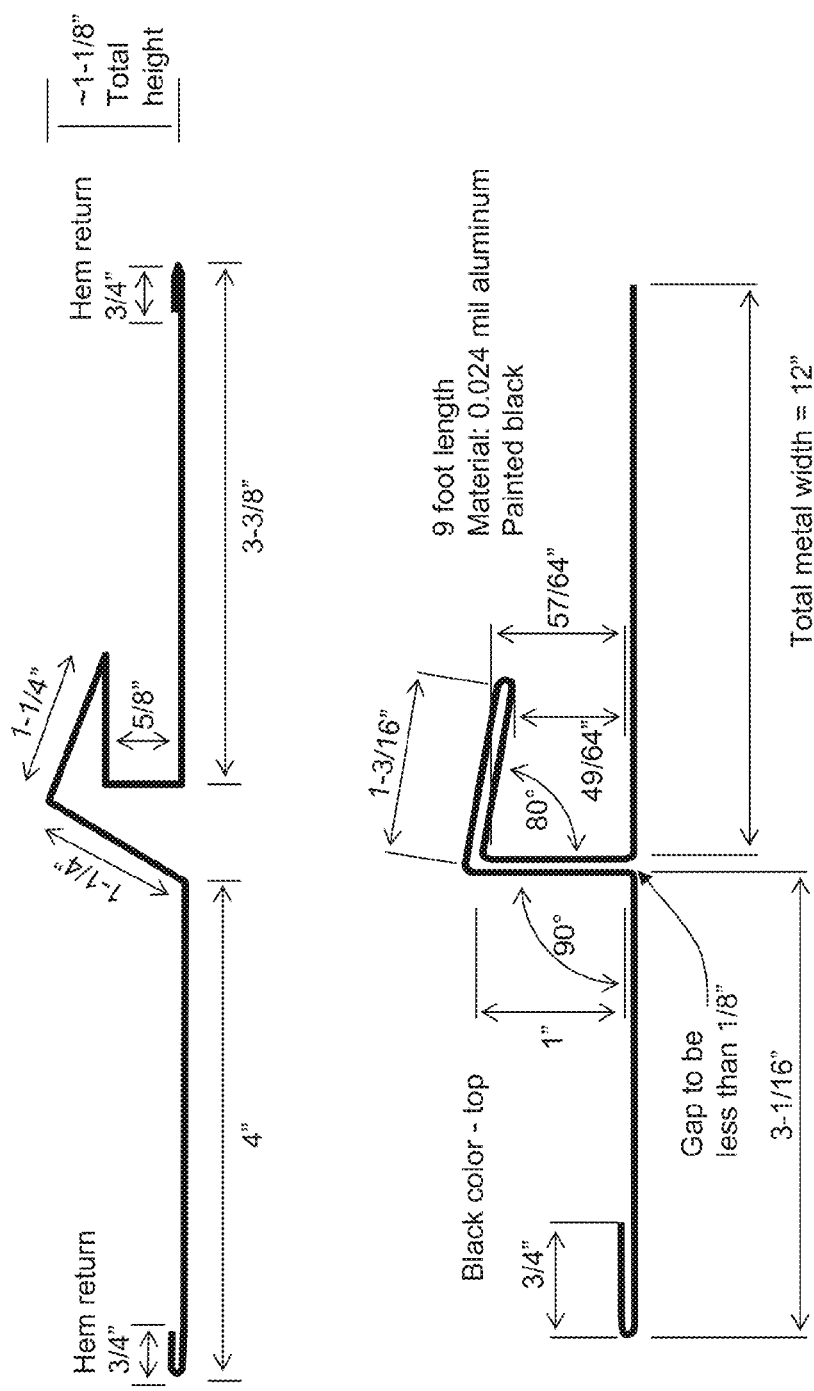
Figure 18:
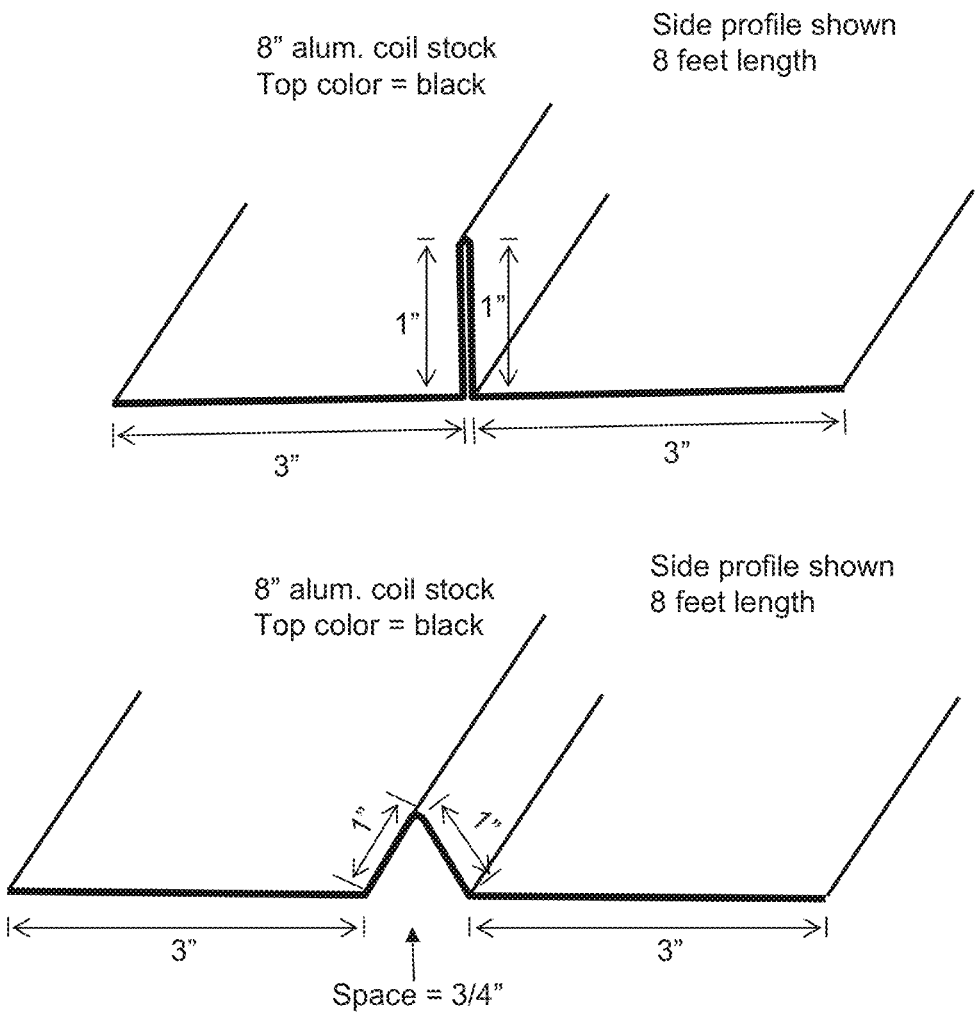

One possible set of flashings for use in various aspects of the present invention is shown in the cross-sectional views of FIGS. 14-19. FIGS. 14 and 15 show, respectively, a top flashing and a base piece for use therewith. FIG. 16 shows a bottom flashing; FIG. 17 shows two alternative side flashings; and FIG. 18 shows two alternative flashings for the interfaces between photovoltaic elements.

Figure 19:
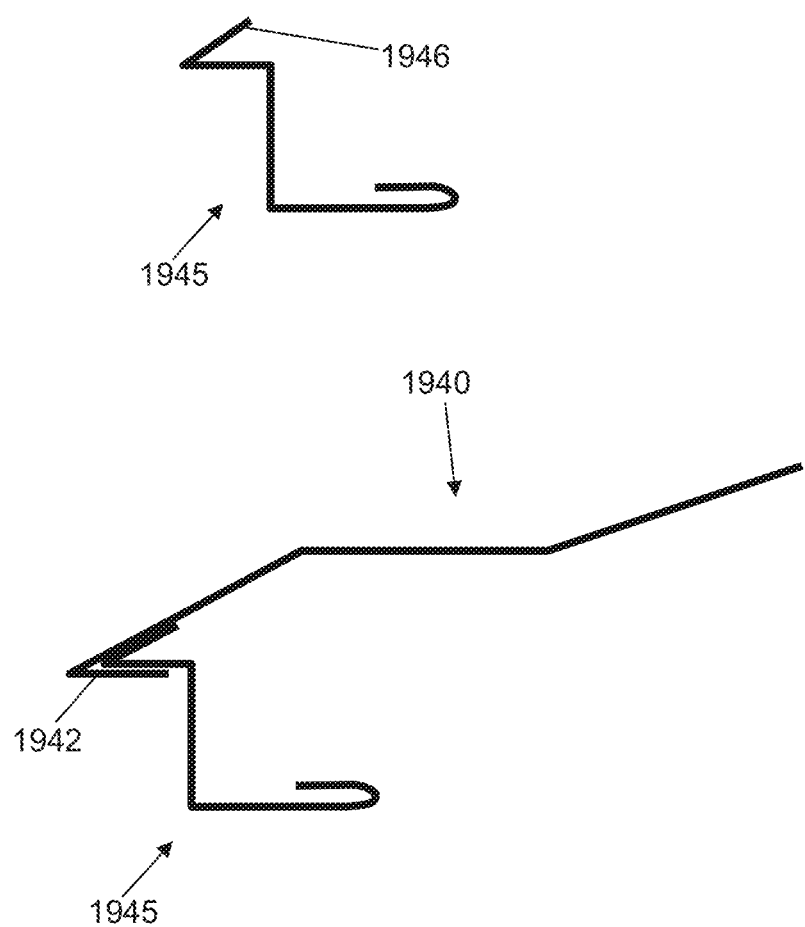
FIG. 19 is a set of schematic cross-sectional views of a top flashing and a base piece according to one embodiment of the invention.

FIG. 19 provides schematic cross-sectional views of a top flashing and a base piece according to one embodiment of the invention. Base piece 1945 is similar to that shown in FIG. 15, and includes a hemmed return 1946 that bends up; in this example, it remains at an angle with respect to the segment from which it extends. Top flashing 1940 is similar to that shown in FIG. 14, and includes a lip 1942 that is to mate with the base piece 1945. When the two mate, the hemmed return of the base piece is pushed in somewhat, and spring forces create pressure against the top flashing. A similar situation is created when the top flashing of FIG. 14 mates with the base piece of FIG. 15. This feature not only adds rigidity, but also can act to block entrance of severe wind-driven moisture.

Figure 20:
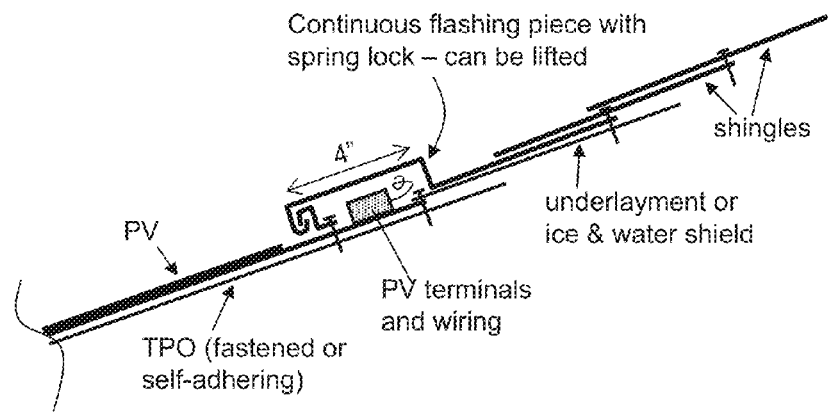
FIGS. 20-23 are a set of schematic partial cross-sectional views of photovoltaic roofing systems according to various embodiments of the invention.
Figure 21:
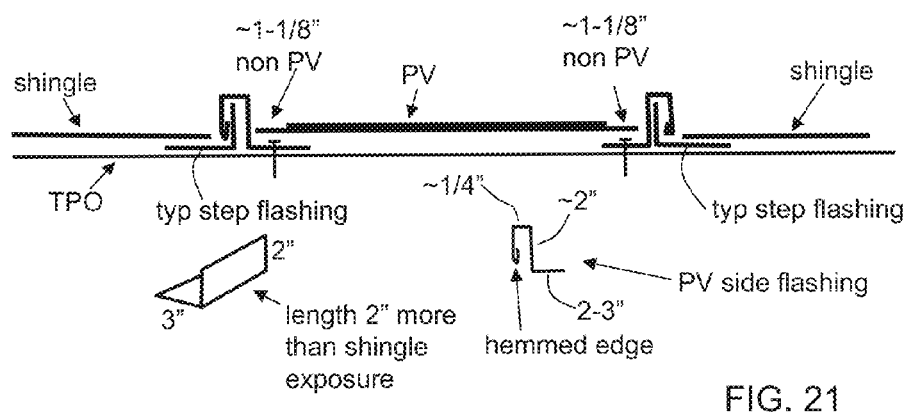
Figure 22:
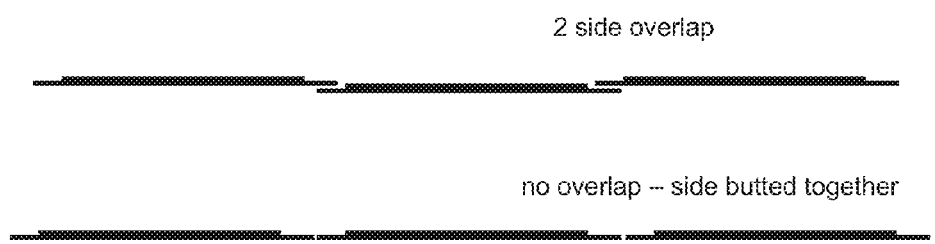
Figure 23:
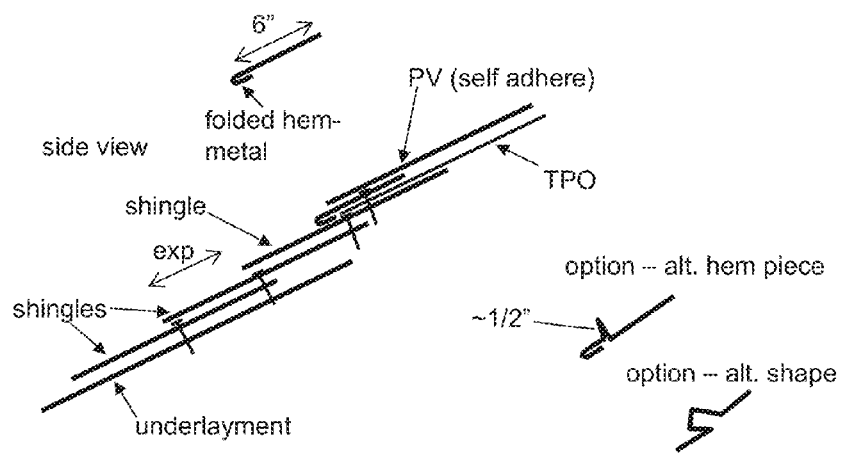

Additional configurations suitable for use in various aspects of the invention are shown in FIGS. 20-23. FIG. 20 is a schematic partial cross-sectional side view of the top end of a photovoltaic roofing system according to one embodiment of the invention. FIG. 21 is a schematic partial cross-sectional view looking up the roof of a photovoltaic roofing system according to one embodiment of the invention. FIG. 22 is a pair of schematic cross-sectional views of two examples of contiguously-disposed photovoltaic elements (e.g., overlapping or abutted). FIG. 23 is a schematic partial cross-sectional side view of the bottom end of a photovoltaic roofing system according to one embodiment of the invention.

Figure 24:
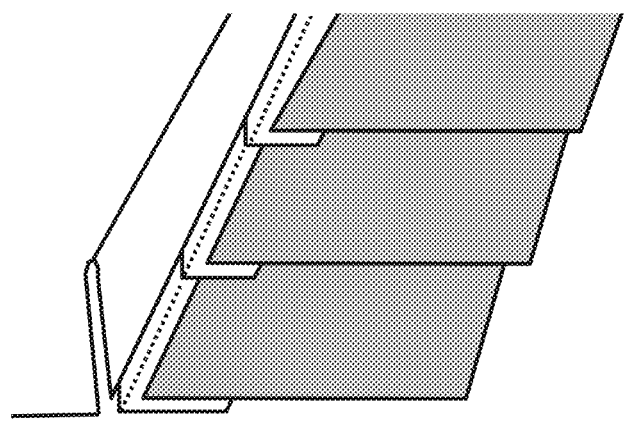
FIG. 24 is a schematic partial perspective view of a photovoltaic roofing system as described herein, showing the interaction of step flashing elements with roofing elements.

Example 1 of a photovoltaic roofing system according to the invention uses as photovoltaic elements certain photovoltaic laminates, model PVL-68, available from Uni-Solar Ovonics. The roofing elements are 2-layer laminated architectural shingles, similar to those available from CertainTeed Corporation, and are conventionally installed on a roof deck. Coated aluminum flashings are bent to shape as described above, and nailed to the roof deck. A TPO membrane is placed between the PVL-68 photovoltaic elements and the roofing underlayment; the self-stick adhesive of the PVL-68 photovoltaic elements adheres them to the membrane. The interaction of step flashing with roofing elements is shown in FIG. 24.

Figure 25:
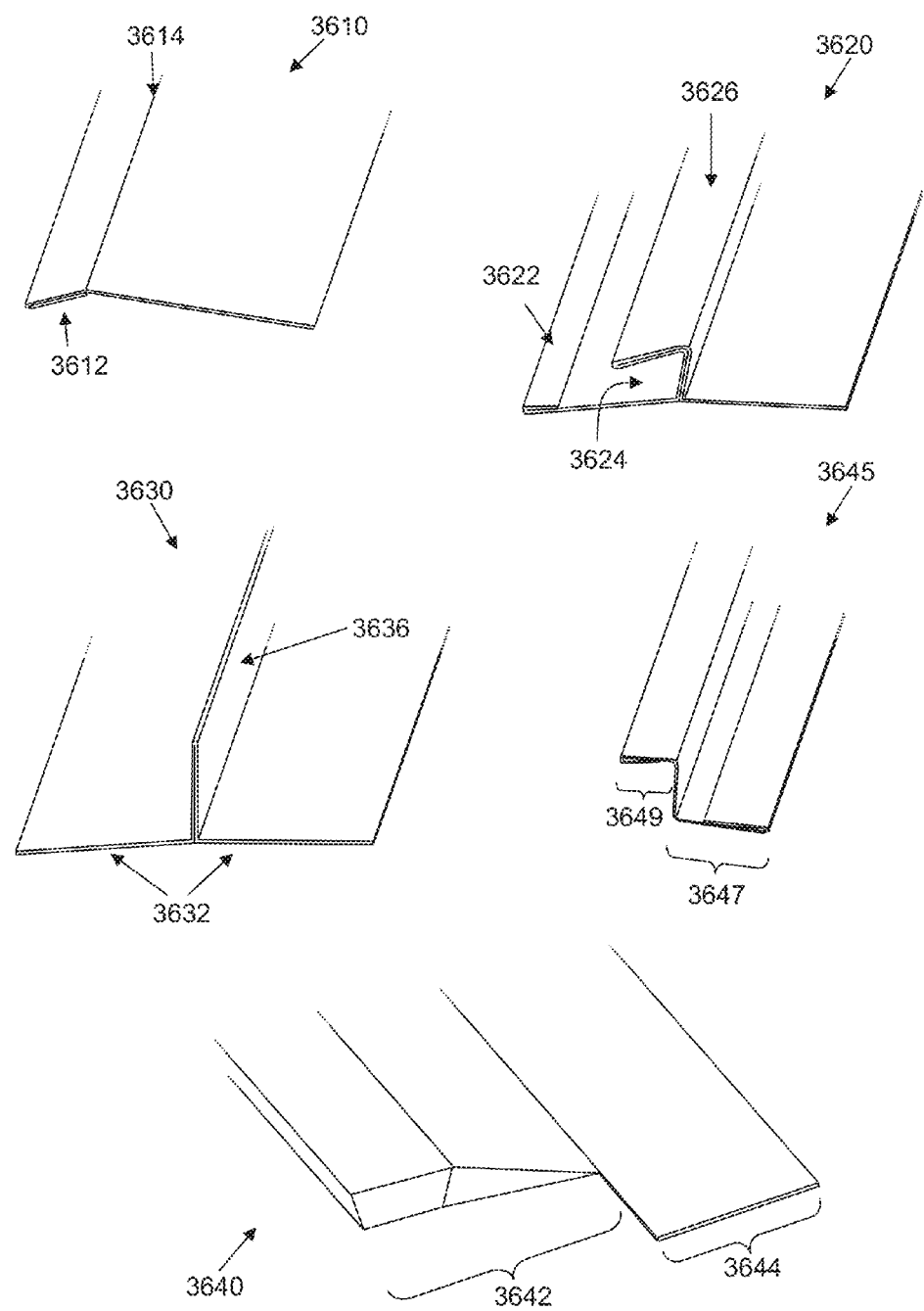
FIG. 25 is a partial side perspective view of a set of flashings for use in practicing one embodiment of the invention.

A set of flashings for the installation of Example 2 of a photovoltaic roofing system is shown in partial side perspective view in FIG. 25. The drawings of FIG. 25 are not necessarily scaled to one another. Bottom flashing 3610 has a hemmed return 3612 at its bottom edge (i.e., the edge that is meant to be disposed on the down-roof side), and is slightly bent, with a crease 3614 separating its up-roof and down-roof sections. Side flashing 3620 has a hemmed return 3622 on its outward-facing edge (i.e., the edge meant to be disposed toward the roofing elements, and a recessed insertion point 3624 formed by a bend in its vertically-extending feature 3626. At one end of the side flashing piece, the vertically-extending feature does not extend all the way to the end. Standing seam flashing 3630 (for use in between contiguously-disposed photovoltaic elements) has flanges 3632, and vertically-extending feature 3636. At one end of the standing seam flashing piece, the vertically-extending feature does not extend all the way to the end. The top flashing 3640 has a linearly-extending cover section 3642 that forms a recess into which electrical components can fit. The material of the cover section is bent down at the ends to close off the recess. The linearly-extending flat section 3644 extends beyond the cover section on either end. A base piece, wire cover locking tab strip 3645, has a flat section 3647 and a raised section 3649. In this wire cover locking tab strip, the hemmed return on the raised section folds down. In other embodiments, it can fold up, as described above with respect to FIG. 19.

For this retrofit or "cut-in" application, the position of the photovoltaic array is determined. Shingles are cut and removed to open up a rectangle 18" beyond the planned array area on the left side, right side, and top side of the array. The size of the array is determined using the size and number of photovoltaic laminates. The bottom of the array is aligned roughly with the top of the exposed shingle area for the highest remaining shingle course. Removed shingles are re-used around the perimeter areas, as needed.

TPO membrane is laid on the roof deck in the open rectangular area. The lower edge of the TPO membrane is aligned with the top of the shingles' exposed area on the uppermost remaining shingle course bordering the open rectangle. The TPO membrane is fastened by overlapping each course of TPO up the slope of the roof by about 2" (upper piece over lower piece), and fastening it with corrosion-resistant roofing nails in a staggered pattern with horizontal rows spaced 12-14" up the roof and nails within a row approximately 12" apart.

A vertical chalk line is snapped on the TPO membrane 8" in from its left edge. A bottom flashing piece is oriented such that the hemmed return covered the lower edge of the TPO membrane, with the end of the bottom flashing piece in about 2" from the chalk line, and the bottom edge of the bottom flashing piece about ½" below the top of the uppermost shingle exposure. In order to span the length of the open rectangular area, additional bottom flashing pieces are added in an overlapping manner (by at least 4"), nesting the parts together. Adjacent bottom flashing pieces are electrically interconnected using aluminum peel-type blind rivets by raising the flashing pieces off of the TPO membrane, pre-drilling 3/16" holes through the nested-together flashing pieces (without puncturing the TPO) and installing the rivet with a rivet gun. The bottom flashing pieces are fastened every 12" at a point 3-4" up from the bottom edge.

Figure 26:
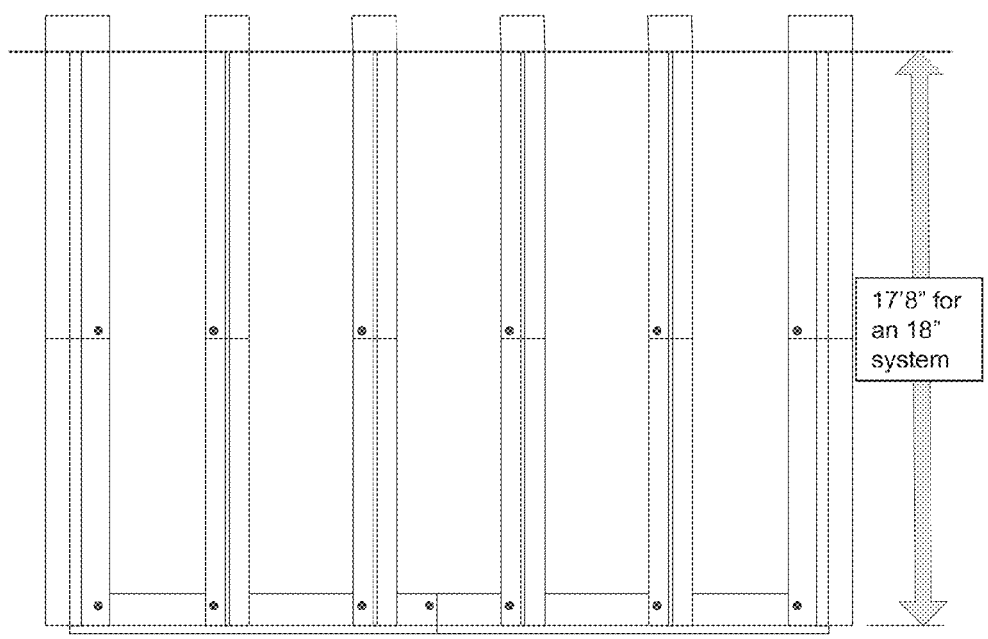
FIG. 26 is a schematic top view of the configuration of the bottom and side flashing pieces and standing seam flashing pieces according to one embodiment of the invention.

Next, the side flashing pieces and the standing seam flashing pieces are installed. FIG. 26 is a schematic top view of the configuration of the bottom and side flashing pieces and standing seam flashing pieces in this Example. Beginning on the left side of the bottom flashing, a side flashing piece is positioned such that the recessed insertion point faces left. Additional side flashing pieces are trimmed and positioned as necessary to span the height of the open rectangular area (measured to leave an appropriate amount of room for the top flashing pieces, as described below). The side flashing pieces are electrically interconnected with rivets, and attached by fastening every 12" on both sides of each flange about 1" in from their outer edges. The left edge of the side flashing piece is aligned with the chalk line, and the bottom edge of the side flashing piece is aligned with the crease of the bottom flashing piece. The angle between the side flashing and the bottom flashing is ensured to be 90°. The pieces are electrically connected with an aluminum peel-type blind rivet. As a reference, a chalk line is snapped from the upper end of the raised portion of the side flashing, making sure that it is square with the bottom flashing. This chalk line is used as a reference to ensure that the upper ends of all standing seam tees and the right-hand side flashing piece are positioned correctly. The chalk line is shown schematically in FIG. 26. The standing seam flashing pieces are positioned vertically on the TPO, starting from 16" from the peak of the side flashing piece, and continuing across left to right at 16" centers, finishing with the right side flashing. They are electrically interconnected and affixed as described above for the left-hand side flashing pieces.

Shingles are installed to close up cover the roof surface up to the left. Shingles are positioned in the recessed insertion points, with about a ⅛" gap remaining between the vertically-extending features of the side flashing pieces, cutting shingles as necessary. Shingle installation is stopped two courses below the tops of the side flashing pieces.

The TPO surface is cleaned of dust and debris, and the TPO surface and the exposed flanges are mopped with a non-bleach household cleaner, then with 70% isopropyl alcohol.

Photovoltaic laminates (UniSolar PVL-68) are unrolled in the channels formed by the side flashing pieces and the standing seam flashing pieces. The lower edges are aligned with the crease on the bottom flashing. To affix each photovoltaic laminate, the lower end is lifted up and the release film is separated about 6" up the laminate, and folded back under the remainder of the laminate, thereby exposing the adhesive on the underside of the laminate. The lower end is carefully placed onto the bottom flashing and the TPO membrane, making sure to align its bottom edge with the crease. A J-roller is used to secure the adhesive with pressure. Once affixed, the rest of the laminate is rolled down the roof; in an unrolling fashion, the rest of the release film is removed and the laminate is affixed to the TPO membrane and the flanges of the side flashing and/or standing seam flashing pieces. A J-roller is used to secure the adhesive, by first pressing the center longitudinal area into place along the entire length of the laminate starting at the top end of the roof, then by rolling from the center out toward each edge, working in intervals down the roof.

Next, courses of shingles are applied up the roof to cover the top ends of the side flashing pieces. The installation is generally as described above, but the top-most shingles against the side flashings are notched to fit the end of the raised feature of the side flashing piece and be flush with the photovoltaic laminate.

The top wire cover locking tab strip pieces are installed to extend 5" beyond the peak of the side flashing pieces. They are nestedly overlapped by at least 2" as necessary to span the length of the open area, and positioned to rest against the raised portions of the side flashing pieces and standing seam flashing pieces. Wire cover locking tab strip pieces are electrically connected to one another and to the side flashing pieces with rivets.

As the top wire cover locking tab strip pieces go over the photovoltaic laminates, care must be taken to avoid damaging the photovoltaic laminates when affixing them to the roof. A screw penetration template can be used. The screw penetration template is designed to show safe areas to screw through the top wire cover locking tab strips and the photovoltaic laminate when aligned, for example, with certain features of the photovoltaic laminate. Screws are affixed through the locking tab strip pieces at two points on each photovoltaic laminate.

Self-stick mounting pads are affixed to the TPO just above the junction box on each photovoltaic laminate, and cable ties are used to tie down the cables emerging from the junction boxes. The cables are looped to lie along the locking tab strip.

Top flashing pieces are cut to length as necessary to span the length of the top wire cover locking strips. The ends of the outermost top flashing pieces are positioned so that their outer folded edges butt up against the outer edge of the top wire cover locking tab strips. Adjacent top wire cover pieces are nestedly overlapped by at least 4". The upper flange of the top wire cover is fastened against the roof using screws, every 12" positioned 2-3" from the top edge of the flange. Shingles are applied over the flange, following the pattern of shingles on the rest of the roof, cut as necessary to ensure that the bottom edge of the shingles overlying the top wire cover coincide with the top bend line of the top wire cover. Electrical connections are completed as is conventional in the art; the top cover pieces can be lifted to access the electrical connectors of the photovoltaic laminates.

Further, the foregoing description of embodiments of the present invention has been presented for the purposes of illustration and description. It is not intended to be exhaustive or to limit the invention to the precise forms disclosed. As the person of skill in the art will recognize, many modifications and variations are possible in light of the above teaching. It will be apparent to those skilled in the art that various modifications and variations can be made to the present invention without departing from the scope of the invention. Thus, it is intended that the present invention cover the modifications and variations of this invention provided they come within the scope of the claims and their equivalents.

What is claimed is:

1. A photovoltaic roofing system disposed on a roof deck having an upper end and a lower end, the photovoltaic roofing system comprising:
   one or more contiguously-disposed photovoltaic elements, the one or more contiguously-disposed photovoltaic elements together having a top edge facing the upper end of the roof deck, a bottom edge facing the lower end of the roof deck, and two side edges, the one or more contiguously-disposed photovoltaic elements defining a photovoltaic area;
   a plurality of roofing elements disposed adjacent the one or more contiguously-disposed photovoltaic elements, along the side edges of the one or more contiguously-disposed photovoltaic elements;
   a plurality of side flashings, each side flashing disposed along one of the side edges of the one or more contiguously-disposed photovoltaic elements, each side flashing having a cross-sectional shape comprising a vertically-extending feature and a flange extending from each lateral side at a bottom of the vertically-extending feature, with the flange facing the photovoltaic area being at least partially disposed between each of one or more of the one or more photovoltaic elements and the roof deck, and the flange facing away from the photovoltaic area being at least partially disposed between at least one of the roofing elements and the roof deck, each side flashing not extending under substantially the entire area of any photovoltaic element,
   wherein each photovoltaic element includes a substantial portion that is not disposed on a flashing, on a roofing element, or on another photovoltaic element and is disposed directly on the roof deck or directly on a roofing membrane or underlayment disposed directly on the roof deck, and
   wherein each side flashing includes a substantial portion that is not disposed on another flashing and is disposed directly on the roof deck or directly on a roofing membrane or underlayment disposed directly on the roof deck.

2. The photovoltaic roofing system according to claim 1, wherein the portion of each photovoltaic element that is not disposed on a flashing, on a roofing element, or on another photovoltaic element is disposed directly on the roof deck, and
   wherein the portion of each side flashing that is not disposed on another flashing is disposed directly on the roof deck.

3. The photovoltaic roofing system according to claim 1, wherein the portion of each photovoltaic element that is not disposed on a flashing, on a roofing element, or on another photovoltaic element is disposed directly on a roofing membrane or underlayment disposed directly on the roof deck, and
   wherein the portion of each side flashing that is not disposed on another flashing is disposed directly on a roofing membrane or underlayment disposed directly on the roof deck.

4. The photovoltaic roofing system according to claim 1, wherein one or more of the flashings includes a hemmed return.

5. The photovoltaic roofing system according to claim 1, wherein one or more of the flanges of the flashings have flexible portions.

6. The photovoltaic roofing system according to claim 1, wherein the roofing elements are bituminous shingles.

7. The photovoltaic roofing system according to claim 1, wherein at least one of the one or more photovoltaic elements is adhered to the photovoltaic area-facing flange of the side flashing by an adhesive on a bottom surface of the at least one photovoltaic element.

8. The photovoltaic roofing system according to claim 1, wherein the side flashings include a recessed insertion area formed in a side of the vertically-extending feature, and one or more of the roofing elements are at least partially disposed in the recessed insertion area.

9. The photovoltaic roofing system according to claim 1, wherein at least one of the side flashings is provided as one or more continuous pieces of flashing on a side facing the one or more photovoltaic elements, and a plurality of stepped side flashing pieces on a side facing the roofing elements.

10. The photovoltaic roofing system according to claim 1, wherein a plurality of the photovoltaic elements are disposed in the photovoltaic area.

11. The photovoltaic roofing system according to claim 10, further comprising flashing disposed at interfaces between adjacent contiguously disposed photovoltaic elements.

12. The photovoltaic roofing system according to claim 10, wherein the plurality of photovoltaic elements is a linear array of strip-shaped photovoltaic elements, and the photovoltaic roofing system further comprises standing seam flashing, the standing seam flashing having a cross-sectional shape comprising a vertically extending feature, and two flanges, one extending laterally from each side at a bottom of the vertically extending feature, wherein the standing seam flashing is disposed at each interface between laterally contiguously disposed photovoltaic elements, with each flange being disposed between one of the contiguously disposed photovoltaic elements and the roof deck.

13. The photovoltaic roofing system according to claim 1, further comprising a roofing element disposed along the bottom edge of the photovoltaic area;
and a bottom flashing disposed along the bottom edge of the photovoltaic area, disposed at least partially underneath at least one of the one or more photovoltaic elements and at least partially on top of the roofing element disposed along the bottom edge of the photovoltaic area.

14. The photovoltaic roofing system according to claim 13, wherein the bottom flashing has a cross-sectional shape comprising a vertically-extending feature and a flange extending from each lateral side at a bottom of the vertically-extending feature, with the flange facing the photovoltaic area being disposed at least partially underneath at least one of the one or more photovoltaic elements, and the flange facing away from the photovoltaic area being disposed at least partially on top of the roofing element disposed along the bottom edge of the photovoltaic area.

15. The photovoltaic roofing system according to claim 1, further comprising a roofing element disposed along the top edge of the photovoltaic area; and a top flashing disposed along the top edge of the photovoltaic area, the top flashing disposed at least partially under the roofing element disposed along the top edge of the photovoltaic area, and at least partially over the one or more photovoltaic elements.

16. The photovoltaic roofing system according to claim 15, wherein the top flashing includes one or more cavities, one or more recesses, or one or more cavities and one or more recesses that act as a cover, a conduit, or both a cover and a conduit for electrical features protruding from a surface of the one or more photovoltaic elements at the top edges of the one or more photovoltaic elements.

17. The photovoltaic roofing system according to claim 1, wherein at least one of the side flashings includes a recessed insertion area formed in the vertically-extending feature, overhanging at least one of the flanges.

18. The photovoltaic roofing system according to claim 17, wherein at least one of the plurality of roofing elements is disposed in the recessed insertion area.

19. The photovoltaic roofing system according to claim 17, wherein at least one of the one or more photovoltaic elements is disposed in the recessed insertion area.

20. A method for installing the photovoltaic roofing system according to claim 1 onto a roof comprising a roof deck having an upper end and a lower end, the method comprising:
disposing the side flashings along the side edges of the photovoltaic area, such that each side flashing includes a substantial portion that is not disposed on another flashing and is disposed directly on the roof deck or directly on a roofing membrane or underlayment disposed directly on the roof deck, each side flashing having a cross-sectional shape comprising a vertically-extending feature and a flange extending from each lateral side at the bottom of the vertically-extending feature, with the flange facing away from the photovoltaic area being at least partially disposed between a roofing element disposed along the side edges of the photovoltaic area and the roof deck; and then
contiguously disposing the one or more photovoltaic elements in the photovoltaic area, such that each photovoltaic element includes a substantial portion that is not disposed on a flashing, on a roofing element, or on another photovoltaic element and is disposed directly on the roof deck or directly on a roofing membrane or underlayment disposed directly on the roof deck, with the flange of the side flashing facing the photovoltaic area being at least partially disposed between a photovoltaic element and the roof deck, each side flashing not extending under substantially the entire area of any photovoltaic element.

21. The method according to claim 20, wherein the roof further comprises roofing elements arrayed on the roof deck, the method further comprising, before performing the disposing steps, removing a plurality of roofing elements disposed within an area surrounding the photovoltaic area.

* * * * *